(12) United States Patent
Shamaie

(10) Patent No.: US 8,170,281 B2
(45) Date of Patent: *May 1, 2012

(54) DETECTING AND TRACKING OBJECTS IN IMAGES

(75) Inventor: Atid Shamaie, Ontario (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/461,366

(22) Filed: Aug. 10, 2009

(65) Prior Publication Data

US 2009/0295756 A1     Dec. 3, 2009

Related U.S. Application Data

(60) Continuation of application No. 12/078,852, filed on Apr. 7, 2008, now Pat. No. 7,574,020, which is a division of application No. 11/326,345, filed on Jan. 6, 2006.

(60) Provisional application No. 60/641,734, filed on Jan. 7, 2005.

(51) Int. Cl.
*G06K 9/00* (2006.01)
*G09G 5/02* (2006.01)
*H04N 5/225* (2006.01)

(52) U.S. Cl. .......................... 382/103; 345/594; 348/169

(58) Field of Classification Search ................... 382/103, 382/107, 159, 181, 305, 312; 345/166, 173, 345/179, 594, 661; 348/169

See application file for complete search history.

(56) References Cited

U.S. PATENT DOCUMENTS

| 4,746,770 A | 5/1988 | McAvinney |
| 5,164,992 A | 11/1992 | Turk et al. |

(Continued)

FOREIGN PATENT DOCUMENTS

JP     11015945 A     1/1999

(Continued)

OTHER PUBLICATIONS

Georghiades, et al., "From Few to Many: Illumination Cone Models for Face Recognition under Variable Lighting and Pose," *IEEE Transactions on Pattern Analysis and Machine Intelligence*, vol. 23, No. 6, Jun. 2001, 18 pages.

(Continued)

*Primary Examiner* — Kanjibhai Patel

(74) *Attorney, Agent, or Firm* — Kilpatrick Townsend & Stockton LLP

(57) ABSTRACT

According to one disclosed method, coordinates in a multi-dimensional space are determined for an image point characterizing a particular object. An equation describing a model in the space is provided. The model is characteristic of a set of training images of one or more other objects. The coordinates are applied to the equation to determine a distance between the image point and the model. Based on the determined distance, a determination is made as to whether the particular object matches the one or more other objects. A set of training images may be received. A multi-dimensional space (e.g., eigenspace) may be determined based on the set of training images. A set of training points may be generated by projecting the set of training images into the multi-dimensional space. An equation describing a model in the multi-dimensional space that is characteristic of the set of training points may be determined.

22 Claims, 27 Drawing Sheets
(4 of 27 Drawing Sheet(s) Filed in Color)

U.S. PATENT DOCUMENTS

| | | | |
|---|---|---|---|
| 5,435,554 | A | 7/1995 | Lipson |
| 5,454,043 | A | 9/1995 | Freeman |
| 5,483,261 | A | 1/1996 | Yasutake |
| 5,528,263 | A | 6/1996 | Platzker |
| 5,534,917 | A | 7/1996 | MacDougall |
| 5,659,397 | A * | 8/1997 | Miller et al. ................. 356/446 |
| 5,710,833 | A | 1/1998 | Moghaddam et al. |
| 5,818,421 | A | 10/1998 | Ogino et al. |
| 5,982,352 | A | 11/1999 | Pryor |
| 6,008,800 | A | 12/1999 | Pryor |
| 6,075,905 | A | 6/2000 | Herman et al. |
| 6,100,538 | A | 8/2000 | Ogawa |
| 6,147,678 | A | 11/2000 | Kumar et al. |
| 6,204,852 | B1 | 3/2001 | Kumar et al. |
| 6,215,890 | B1 | 4/2001 | Matsuo et al. |
| 6,275,214 | B1 | 8/2001 | Hansen |
| 6,434,255 | B1 | 8/2002 | Harakawa |
| 6,526,156 | B1 | 2/2003 | Black et al. |
| 6,535,114 | B1 | 3/2003 | Suzuki et al. |
| 6,683,677 | B2 | 1/2004 | Chon et al. |
| RE38,420 | E | 2/2004 | Thomas |
| 6,720,949 | B1 | 4/2004 | Pryor et al. |
| 6,760,009 | B2 | 7/2004 | Omura et al. |
| 6,762,747 | B2 | 7/2004 | Fujioka et al. |
| 6,791,531 | B1 | 9/2004 | Johnston et al. |
| 6,803,906 | B1 | 10/2004 | Morrison et al. |
| 6,819,782 | B1 | 11/2004 | Imagawa et al. |
| 6,977,643 | B2 * | 12/2005 | Wilbrink et al. .............. 345/156 |
| 7,046,229 | B1 * | 5/2006 | Drake ........................... 345/156 |
| 7,058,204 | B2 | 6/2006 | Hildreth et al. |
| 7,084,859 | B1 | 8/2006 | Pryor |
| 7,170,492 | B2 | 1/2007 | Bell |
| 7,227,526 | B2 | 6/2007 | Hildreth et al. |
| 2001/0013950 | A1 | 8/2001 | Pornbacher |
| 2002/0153188 | A1 | 10/2002 | Brandt et al. |
| 2002/0186221 | A1 | 12/2002 | Bell |
| 2003/0004678 | A1 | 1/2003 | Zhang et al. |
| 2003/0098841 | A1 | 5/2003 | Broussard |
| 2004/0183775 | A1 | 9/2004 | Bell |
| 2004/0207600 | A1 | 10/2004 | Zhang et al. |
| 2004/0257452 | A1 | 12/2004 | Chang et al. |
| 2005/0088407 | A1 | 4/2005 | Bell et al. |
| 2005/0089194 | A1 | 4/2005 | Bell |
| 2005/0110964 | A1 | 5/2005 | Bell et al. |
| 2005/0122308 | A1 | 6/2005 | Bell et al. |
| 2005/0162381 | A1 | 7/2005 | Bell et al. |
| 2005/0238201 | A1 | 10/2005 | Shamaie |
| 2006/0007170 | A1 | 1/2006 | Wilson et al. |
| 2006/0008149 | A1 | 1/2006 | Tu et al. |
| 2006/0044282 | A1 | 3/2006 | Pinhanez et al. |
| 2006/0132432 | A1 | 6/2006 | Bell |
| 2006/0139314 | A1 | 6/2006 | Bell |
| 2008/0219502 | A1 | 9/2008 | Shamaie |

FOREIGN PATENT DOCUMENTS

| | | |
|---|---|---|
| WO | WO 02/29722 | 4/2002 |
| WO | 2004/044823 | 5/2004 |

OTHER PUBLICATIONS

Müller, et al., "An Introduction to Kernel-Based Learning Algorithms," *IEEE Transactions on Neural Networks*, vol. 12, No. 2, Mar. 2001, 21 pages.

Supplementary European Search Report from European Patent Application No. 06 71 7487, dated Dec. 17, 2009, 9 pages.

Communication pursuant to Article 94(3) EPC for corresponding European Application No. 06717487, mailed Jan. 28, 2011, 5 pages.

U.S. Appl. No. 60/296,189, filed Jun. 5, 2001, Bell.

U.S. Appl. No. 60/433,158, filed Dec. 13, 2002, Bell.

U.S. Appl. No. 60/504,375, filed Sep. 18, 2003, Bell.

U.S. Appl. No. 60/514,024, filed Oct. 24, 2003, Bell.

U.S. Appl. No. 60/514,232, filed Oct. 24, 2003, Bell.

U.S. Appl. No. 60/528,439, filed Dec. 9, 2003, Bell.

U.S. Appl. No. 60/554,520, filed Mar. 18, 2004, Bell.

U.S. Appl. No. 60/599,399, filed Aug. 6, 2004, Bell.

A. Shamaie et al., "A New Transformation Technique for Accurate Estimation of Partly-Occluded Ellipse Parameters", Scientia Iranica, vol. 6, No. 1, © Sharif University of Technology, Jan. 1999, pp. 43-50.

Alex Pentland, "Looking at People: Sensing for Ubiquitous and Wearable Computing", IEEE Transactions on Pattern Analysis and Machine Intelligence, vol. 22, No. 1, Jan. 2000, pp. 107-119.

Alexa Hauck, et. al, "Hierarchical recognition of Articulated Objects from Single Perspective Views", 1997 IEEE Computer Society Conference on Computer Vision and Pattern Recognition (1997), 7 pages.

Andrew D. Wilson, et. al, "Parametric Hidden Markov Models for Gesture Recognition", IEEE Transactions on Pattern Analysis and Machine Intelligence, vol. 21, No. 9., Sep. 1999, pp. 884-900.

Andrew Wilson, et. al, "Using Configuration States for the Representation and Recognition of Gesture", M.I.T. Laboratory Perceptual Computing Section Technical Report No. 308 (1995), pp. 1-11.

Anil K. Jain , et. al, "Statistical Pattern Recognition: A Review", IEEE Transactions on Pattern Analysis and Machine Intelligence, vol. 22, No. 1, Jan. 2000, 34 pages.

Atid Shamaie et al., "Accurate Estimation of Partly-Occluded Ellipse Parameters", Fifth Iranian Conference on Electrical Engineering , May 7-9, 1997, Department of Electrical and Computer Engineering, University of Tehran, Tehran, Iran, 14399, 11 pages.

Atid Shamaie et al., "Graph-Based Matching of Occluded Hand Gestures", Proceedings of the $30^{th}$ on Applied Imagery Pattern Recognition Workshop, 2001, 7 pages.

Atid Shamaie, "Hand-Tracking and Bimanual Movement Understanding", Ph.D Thesis, Dublin City University (2003), 237 pages.

Atid Shamaie, et. al, "Accurate Recognition of Large Number of Hand Gestures", (2003), 10 pages.

Baback Moghaddam, "Principal Manifolds and Bayesian Subspaces for Visual recognition", Merl A Mitsubishi Electrical Research Laboratory, TR-99-35, Jul. 1999, 8 pages.

Baback Moghaddam, et. al, "Beyond Eigenfaces: Probabilistic Matching for Face Recognition", MIT Media Laboratory Perceptual Computing Section Technical Report No. 443, (1998), pp. 1-6.

Baback Moghaddam, et. al, "Probabilistic Visual Learning for Object Detection", M.I.T. Media Laboratory Perceptual Computing Section Technical Report No. 326, (1995), pp. 1-8.

Bernhard Scholkopf, et. al, "Kernel PCA Pattern Reconstruction via Approximate Pre-Images" (1998), Proceedings of the 8th International Conference on Artificial Neural Networks, 6 pages.

Bernhard Scholkopf, et. al, "Nonlinear Component Analysis as a Kernel Eigenvalue Problem", Technical Repot No. 44, Dec. 1996, available at http://www.mpik-tueb.mpg.de/bu.html, pp. 1-18.

Brown, Robert Grover, et al., "Introduction to Random Signals and Applied Kalman Filtering, with Matlab Exercises and Solutions", Third Edition, John Wiley & Sons, USA, (1997), pp. 214-252.

Christopher M. Harris, et. al, "Signal-dependent noise determines motor planning", Nature: vol. 394, Aug. 20, 1998, pp. 780-784.

Chui, C. K., et al., "Kalman Filtering with Real-Time Applications", Third Edition, Springer-Verlag, Berlin Heidelberg, (1999), pp. 1-67.

Chung-Lin Huang, et. al, "Recognition Using the Multi-PDM Method and Hidden Markov Models" Institute of Electrical Engineering, Vision Interface '99, Trois-Rivieres, Canada, May 19-21, 1999, pp. 468-474.

Cowell, Robert G., et al., "Probabilistic Networks and Expert Systems", Springer-Verlag, New York, (1999), (pp. 1-41).

Dana Ron, et. al, "The Power of Amnesia: Learning Probabilistic Automata with Variable Memory Length", Machine Learning, Springer Netherlands (1996), pp. 1-31.

David Heckerman, "A Tutorial on Learning With Bayesian Networks", Nov. 1996, Technical Report MSR-TR-95-06, Microsoft Research Advanced Technology Division, 58 pages.

Dockstader et. al., "Tracking Multiple Objects in the Presence of Articulated and Occluded Motion." Workshop on Human Motion, 2000, pp. 88-95.

Edwards, Jeff, et al., "Appearance Matching of Occluded Objects Using Coarse-to-Fine Adaptive Masks", Proceedings from Conference Computer Vision and Pattern Recognition, CVPR'97, Puerto Rico, (1997), pp. 533-539.

Erenshteyn, Roman, et al., "Distributed Output Encoding for Multi-Class Pattern Recognition", 10th IEEE International Conference Image Analysis and Processing, Venice, (Sep. 1999), 6 pages.

F. Mechsner, "Why are we particularly good at performing symmetrical movements", MaxPlack Research, 2002, 1 page.

Franz Mechsner, et. al, "Perceptual basis of bimanual coordination", Nature vol. 414, Nov. 2001, pp. 69-73.

Fukushima, Kunihiko, "Recognition of Occluded Patterns: A Neural Network Model", Proceedings from IEEE International Joint Conference Neural Networks, IJCNN'00, (2000), pp. 135-138.

G. McAllister, et. al, "Hand tracking for behaviour understanding" Image and Vision Computing 20 (2002), pp. 827-840.

G.M. Jackson, et. al, "The coordination of bimanual prehension movements in a centrally deafferented patient," Brain (2000), 123,380 393 (Oxford University Press 2000), 14 pages.

Habili, Nariman, et al., "Hand and Face Segmentation Using Motion and Color Cues in Digital Image Sequences", IEEE International Conference on Multimedia & Expo 2001, Tokyo, Japan, (2001) 11 pages.

Heidemann, Gunther, et al., "A System for Various Visual Classification Tasks Based on Neural Networks", Proceedings from International Conference Pattern Recognition, Barcelona, (2000), pp. 9-12.

Heidemann, Gunther, et al., "Segmentation of partially Occluded Objects by Local Classification", Proceedings from International Joint Conference Neural Networks, IIJCNN'2000, Como, Italy, (2000), pp. 152-157.

Hill, Andrew, et al., "A Framework for Automatic Landmark Identification Using a New Method of Nonrigid Correspondence", IEEE Transactions on Pattern Analysis and Machine Intelligence, vol. 22, No. 3 (Mar. 2000), pp. 241-251.

Horst Bunke, "Recent Developments in Graph Matching", 15th International Conference on Pattern Recognition (2000), 8 pages.

Hyeon-Kyu Lee, et. al, "An HMM-Based Threshold Model Approach for Gesture Recognition", IEEE Transactions on Pattern Analysis and Machine Intelligence, vol. 21, No. 10 (Oct. 1999), pp. 961-973.

I.T. Jolliffe, "Chapter 1. Introduction" and "Chapter 2. Mathematical and Statistical Properties of Population Principal Components", *Principal Component Analysis*, Springer Series in Statistics, Springer-Verlag, 1986, pp. 1-22.

International Search Report, Application Serial No. PCT/US05/13033, dated Apr. 10, 2007, 8 pages.

International Search Report, Application Serial No. PCT/US06/00294, dated Dec. 26, 2007, 11 pages.

Ioannis Pitas, "Chapter 6. Image Segmentation Algorithms", *Digital Image Processing Algorithms* Prentice Hall International Series in Acoustics, Speech and Signal Processing, 1993, pp. 254-297.

J. Chen, et. al, "Visual modeling and evaluation of surgical skill", Springer-Verlag London Limited, 2003, pp. 1-11.

J. Eisenstein, et. al, "Analysis of Clustering Techniques to Detect Hand Signs", International Symposium on Intelligent Multimedia, Video, and Speech Processing (2001), 4 pages.

James Davis, et. al, "Toward 3-D Gesture Recognition" International Journal of Pattern Recognition and Artificial Intelligence, vol. 13, No. 3 (1999), 16 pages.

James MacLean, et. al, "Fast Hand Gesture Recognition for Real-Time Teleconferencing Applications", Proceedings Second Workshop on Recognition, Analysis, and Tracking Gestures in Real-Time Systems, IEEE (2001), pp. 1-8.

James P. Mammen et. al, "Simultaneous Tracking of Both Hands by Estimation of Erroneous Observations", SPANN Lab, Department of Electrical Engg., Indian Institute of Technology, British Machine Vision Conference (2001), pp. 83-92.

Jelinek, Frederick, "Statistical Methods for Speech Recognition", The MIT Press, Cambridge, Massachusetts, (1997), (pp. 1-37).

Jorn Diedrichsen, et. al, "Moving to Directly Cued Locations Abolishes Spatial Interference During Bimanual Actions", Psychological Science, vol. 12 No. 6, Nov. 2001, pp. 493-498.

Kenny Morrison, et. al, "An Experimental Comparison of Trajectory-based and History-based Representation for Gesture Recognition", Division of Applied Computing, University of Dundee, (2003), reprint of paper to appear in 5th International Workshop on Gesture and Sign Language based Human Computer Interaction (GW), Genoa, Italy, Apr. 2003, pp. 1-13.

Kevin P. Murphy, et. al, "Loopy Belief Propagation for Approximate Inference: An Empirical Study", Proceedings of Uncertainty in AI (1999), 9 pages.

Koichi Ishibuchi, et. al, "Real Time Hand Gesture Recognition using 3D Prediction Model" ATR Communications Systems Research Laboratories, International Conference Systems, Man, and Cybernetics (1993), 6 pages.

Lamar, Marcus V., et al., "Hand Gesture Recognition Using Morphological Principal Component Analysis and an Improved CombNET-II", Proceedings from IEEE International Conference System, Man, and Cybernetics, Tokyo, (Oct. 1999), pp. 57-62.

Lee Campbell, et. al, "Recognition of Human Body Motion Using Phase Space Constraints", M.I.T. Media Laboratory Perceptual Computing Section Technical Report No. 309., (1995), pp. 1-13.

Lin, Daw-Tung, "Spatio-Temporal Hand Gesture Recognition Using Neural Networks", Proceedings from IEEE World Congress on Computational Intelligence, (1998), pp. 1794-1798.

Linde, Yoseph, et al., "An Algorithm for Vector Quantizer Design", IEEE Transactions on Communications, vol. Com-28, No. 1, (Jan. 1980), pp. 84-95.

Lucas, Bruce D. et al., "An Iterative Image Registration Technique with an Application to Stereo Vision", Computer Science Department, from Proceedings of Imaging Understanding Workshop, pp. 121-129 (1981), Carnegie-Mellon University, Pittsburgh, Pennsylvania.

Lyons, Michael J., et al., "Automatic Classification of Single Facial Images", IEEE Transactions on Pattern Analysis and Machine Intelligence, vol. 21, No. 12, (Dec. 1999), pp. 1357-1362.

M. R. J. Kohler, "System Architecture and Techniques for Gesture Recognition in Unconstraint Environments", Proceedings of the 1997 International Conference on Virtual Systems and Multimedia (1997), 10 pages.

Mammen et. al, "Simultaneous Tracing of Both Hands by Estimation of Erroneous Observations." Proceedings of the British Machine Vision conference, 2001, pp. 83-92.

Martinez, Aleix M., "PCA versus LDA" IEEE Transactions on Pattern Analysis and Machine Intelligence, vol. 23, No. 2, (Feb. 2001), pp. 228-233.

Mathew Brand, et. al, "Coupled Hidden markov models for complex action recognition", 1997 IEEE Computer Society Conference on Computer Vision and Pattern Recognition (1997), 6 pages.

Michael Isard, et. al, "A smoothing filter for Condensation" University of Oxford, Oxford OX1 3PJ, UK (1998), 15 pages.

Michael Isard, et. al, "Condensation—conditional density propagation for visual tracking", Department of Engineering Science, University of Oxford, Oxford OX1 3PJ, UK Int. J. Computer Vision (1998), pp. 1-36.

Michael J. Black, et. al, "EigenTracking: Robust Matching and Tracking of Articulated Objects Using a View-Based Representation", Springer-Verlay (1996), pp. 1-14.

Michael Rivlin, et. al, "A Phone-Dependent Confidence Measure for Utterance Rejection" Speech Technology and Research Laboratory, Proc. ICASSP '96 (1996), 4 pages.

Nebojsa Jojie, et. al, "Tracking Self-Occluding Articulated Objects in Dense Disparity Maps", IEEE International Conference on Computer Vision, Corfu, Greece, Sep. 1999, 8 pages.

Ng, Chan Wah, et al., "Gesture Recognition via Pose Classification", Proceedings from International Conference on Pattern Recognition, ICPR'00, Barcelona, (2000), pp. 699-704.

Nobuyuki Matsushita et al., "HoloWall: Designing a Finger, Hand, Body, and Object Sensitive Wall", UIST 97 Banff, Alberta, Canada, Copyright 1997, ACM 0-89791-881-9/97, pp. 209-210.

Notice of Allowance dated Oct. 31, 2008 in U.S. Appl. No. 11/326,345, 16 pages.

Notice of Allowance dated Apr. 3, 2009 in U.S. Appl. No. 12/078,852, 9 pages.

Notice of Allowance, U.S. Appl. No. 11/106,729, dated Oct. 26, 2007, 10 pages.

Notification of Transmittal of the International Search Report and the Written Opinion of the International Searching Authority, or the Declaration dated Mar. 27, 2007 in International Application No. PCT/US06/00295 (16 pages).

O. Donchin, et. al, "Primary motor cortex is involved in bimanual coordination", Nature: vol. 395, Sep. 17, 1998, pp. 274-278.

P.D. Sozou, et. al, "A Non-linear Generalisation of PDMs using Polynomial Regression", British Machine Vision Conference (1994), 11 pages.

P.D. Sozou, et. al, "Non-linear Point Distribution Modelling using a Multi-layer Perceptron", British Machine Vision Conference 1995, 22 pages.

Pearl, Judea, "Probabilistic Reasoning in Intelligent Systems: Networks of Plausible Inference", Morgan Kaufmann Publishers, Inc., California (1988), pp. 143-235.

Peter Morguet, et. al, "Comparison of Approaches to Continuous Hand Gesture Recognition for a Visual Dialog System", Proc. of ICASSP 99 (1999), 4 pages.

Rehg et. al. "Model-Based Tracking of Self-Occluding Articulated Object." Proceedings of the Fifth International Conference on Computer Vision, 1995, pp. 612-617.

Richard Bowden, et. al, "Building Temporal Models for Gesture Recognition", British Machine Vision Conference (2000), 11 pages.

Schlenzig, Jennifer, et al., "Recursive Identification of Gesture Inputs Using Hidden Markov Models", Proc. $2^{nd}$ IEEE Workshop on Applications of Computer vision, Sarasota, (Dec. 1994), pp. 187-194.

Shai Fine, et. al, "The Hierarchical Hidden Markov Model: Analysis and Applications," Machine Learning, vol. 32, No. 1 (Jul. 1998), pp. 1-23.

Shaogang Gong, et. al, "On the semantics of visual behavior, structured events and trajectories of human action", Image and Vision Computing 20 (2002), pp. 873-888.

Sharmaie et al., "A Dynamic Model for Real-time Tracking of Hands in Bimanual Movements." $5^{th}$ International Workshop on Gesture and Sign Language based Human-Computer Interaction, Genova, Italy, Apr. 15-17, 2003.

Sherrah, Jamie, et al., "Resolving Visual Uncertainty and Occlusion through Probabilistic Reasoning", Proceedings from British Machine Vision Conference, BMVC 2000, Bristol, (Sep. 2000) 10 pages.

Stauffer, Chris, "Automatic Hierarchical Classification Using Time-Based Co-Occurrences", IEEE Conference Computer Vision and Pattern Recognition, CVPR'99, Fort Collins, Colorado, (Jun. 1999), pp. 333-339.

Stephen J. McKenna, et. al, "Gesture Recognition for Visually Mediated Interaction using Probabilistic Event Trajectories", British Machine Vision Conference (1998), pp. 498-507.

Stephen S. Intille, et. al, "Disparity-Space Images and Large Occlusion Stereo", M.I.T. Media Lab Perceptual Computing Group Technical Report No. 220 Condensed version appears in ECCV '94 proceedings, Stockholm, Sweden (1994), pp. 1-12.

Steven W. Kennerley, et. al, "Callosotomy patients exhibit temporal uncoupling during continuous bimanual movements", Nature Neuroscience, Published online: Mar. 4, 2002, DOI: 10.1038/nn822, 6 pages.

Su, Mu-Chun, et al., "Application of Neural Networks in Spatiotemporal Hand Gesture Recognition", Proceedings from IEEE World Congress on Computation Intelligence, (1998), pp. 2116-2121.

T. F. Cootes, et. al, "Training Models of Shape from Sets of Examples", British Machine Vision Conference (1992), 10 pages.

Terrence J. Sejnowski, "Making smooth moves", Nature: vol. 394, Aug. 20, 1998, pp. 725-726.

Thad Starner, et. al, "Visual Recognition of American Sign Language Using Hidden Markov Models", Perceptual Computing Section, The Media Laboratory, Massachusetts Institute of Technology, (1995), 6 pages.

Thad Starner, et. al, "Real-Time American Sign Language Recognition from Video Using Hidden Markov Models", M.I.T. Media Laboratory Perceptual Computing Section Technical Report No. 375, (1995), pp. 1-7.

Thad Starner, et. al, "Real-Time American Sign Language Recognition Using Desk and Wearable Computer Based Video", M.I.T. Media Laboratory Perceptual Computing Section Technical Report No. 466 (1996), pp. 1-7.

Theodoridis, Sergios, et al., Pattern Recognition, Second Edition, Elsevier Academic Press, London, (2003), pp. 13-55.

Tony Heap, et. al, "Improving Specificity in PDMs using a Hierarchical Approach", British Machine Vision Conference (1997), pp. 1-10.

Vic Brennan, et. al, "Multiresolution using Principal Component Analysis", 2000 IEEE International Conference Acoustics, Speech, and Signal Processing (2000), 4 pages.

Vladimir I. Pavlovic et.al., "Visual Interpretation of Hand Gestures for Human-Computer Interaction: A Review", IEEE Transactions on Pattern Analysis and Machine Intelligence, vol. 19, No. 7, Jul. 1997, pp. 677-695.

Wolpert, Daniel M., et al., "Perspectives and Problems in Motor Learning", Trends in Cognitive Science, vol. 5, No. 11, (Nov. 2001), pp. 487-494.

Yair Weiss, "Belief Propagation and Revision in Networks with Loops", A.I. Memo No. 1616, C.B.C.I., Paper No. 155, Nov. 1997, 15 pages.

Yair Weiss, "Correctness of Local Probability Propagation in Graphical Models with Loops", Neural Computation 12, 1-41 (2000), pp. 1-41.

Yair Weiss, et. al, "Correctness of belief propagation in Gaussian graphical models of arbitrary topology", (1999), 25 pages.

Yáñez-Suárez, Oscar, "Unsupervised Clustering in Hough Space for Identification of Partially Occluded Objects", IEEE Transactions on Pattern Analysis and Machine Intelligence, vol. 21, No. 9, (Sep. 1999), pp. 946-950.

Yanghee Nam, et. al, "Recognition of Space-Time Hand-Gestures using Hidden Markov Model", ACM Symposium on Virtual Reality Software and Technology, Hong Kong (1996), 8 pages.

Ying, Zhengrong, et al., "Statistical Model for Occluded Object Recognition", Proceedings from IEEE International Conference Information, Intelligence and Systems, Bethesda, MD (Nov. 1999), 4 pages.

Yongmin Li, et. al, "Recognising Trajectories of Facial Identities Using Kernel Discriminant Analysis", Department of Computer Science, Queen Mary, University of London, 10 pages, British Machine Vision Conference 2001.

Zhou et. al., "A Bayesian Framework for Real-Time 3D Hand Tracking in High Clutter Background." $10^{th}$ International Conference on Human-Computer Interaction, Crete, Greece, 2003.

Zhou, Hanning, et al., "A Bayesian Framework for Real-Time 3D Hand Tracking in High Clutter Background", $10^{th}$ International Conference Human-Computer Interaction, Crete, Greece, (2003), 9 pages.

Zieren, Jorg, et al., "Hands Tracking from Frontal View for Vision-Based Gesture Recognition", Lecture Notes in Computer Science LNCS 2449 Springer, (2002), 8 pages.

Zoubin Ghahramani, "An Introduction to Hidden Markov Models and Bayesian Networks", International Journal of Pattern Recognition and Artificial Intelligence 15(1): 9-42, (2001), 25 pages.

Notice of Allowance, U.S. Appl. No. 11/106,729, dated Mar. 8, 2007, 50 pages.

Written Opinion—PCT/US2006/000294—ISA/EPO—Dec. 26, 2007 (112956WO).

* cited by examiner

DETECTING AND TRACKING OBJECTS IN IMAGES

CROSS-REFERENCE TO RELATED APPLICATIONS

This application is a continuation of U.S. patent application Ser. No. 12/078,852, filed Apr. 7, 2008 and titled "Detecting and Tracking Objects in Images", which is a divisional of U.S. patent application Ser. No. 11/326,345, filed Jan. 6, 2006 and titled "Detecting and Tracking Objects in Images", which claims priority from U.S. Provisional Patent Application Ser. No. 60/641,734, filed Jan. 7, 2005, and titled "Detecting and Tracking Fingertips in Infrared Images." The entire contents of the previous applications are incorporated herein by reference for all purposes.

TECHNICAL FIELD

This disclosure relates to image processing, and, more particularly, to detecting an object in an image.

BACKGROUND

Detection and recognition of objects in an image typically involves image filtering and pattern recognition techniques. Detecting and recognizing objects in an image containing hundreds or thousands of pixels may require extensive processing power and may be time consuming. Therefore, it may be useful to reduce the dimensionality of an image before processing the image to detect and recognize objects in the image. One known technique for reducing dimensionality of data is Principal Component Analysis (PCA). PCA is described in, for example, Joliffe I. T., *Principal Component Analysis*, Springer-Verlag, New York (1986).

PCA uses the eigenvalues and eigenvectors of the covariance matrix of a set of data as representative of valuable features of the set of data, thereby reducing the dimensionality of the set of data.

There exist many methods and mechanisms that enable humans to interact with computers. Computer vision technologies may allow a computer to detect an object within an image captured by a camera. A computer that is capable of detecting and recognizing an object within an image may provide a user with the ability to interact with the computer through the use of hand gestures.

A computer-user interface may be displayed on a surface or screen. One or more cameras may monitor activity in the vicinity of the surface or screen and capture images of the activity in the vicinity of the screen. The computer may then process these images, detect one or more objects within the images, and perceive that a user is using hand gestures to interact with the computer-user interface displayed on the surface or screen.

Some systems attempt to perceive that a user is using hand gestures to interact with the computer-user interface displayed on the surface or screen. Some of these systems simply perceive the brightest object in an image and classify that object as a hand or finger. Consequently, these systems may perceive an object as a hand or finger even though the object is neither a hand nor a finger.

SUMMARY

In order to more accurately identify a hand or a finger in an image and thereby improve the efficacy and efficiency of human interaction with the computer, several disclosed systems (1) recognize an object touching or moving near the surface or screen as a hand or finger and (2) exclude objects that are not recognized as either a hand or a finger.

Methods and apparatus for detection and recognition of fingers touching or moving near a surface or screen are presented. Images are processed in order to detect the presence of a finger and to track the position of the detected finger. The position of a finger may be used by a computer, for example, to control the computer's mouse pointer. The methods presented may be useful for allowing humans to interact with computers in a more natural way than through the use of a conventional mouse and/or keyboard.

In one implementation, a model of one or more fingers positioned in one or more orientations is created. In particular, a set of training images of one or more fingers is captured by a camera. Applying the PCA technique, a model of the set of training images is created. The covariance matrix of the set of training images is determined and a select number of eigenvectors of the covariance matrix is selected to define an eigenspace for the set of training images. Each of the images of the set of training images is projected into the eigenspace defined by the selected eigenvectors of the covariance matrix. In the eigenspace, each training image is represented by a single training point. Therefore, projecting each training image into the eigenspace creates a cloud of training points in the eigenspace. The cloud of training points is then modeled by a geometric model (e.g., surface or line) in the eigenspace.

The model is then used to detect, recognize, and track fingers within an image. In one system, a camera and an infrared (IR) illuminator are placed behind the surface or screen. A finger touching or moving near the surface or screen reflects some of the IR radiation projected by the IR illuminator. Part of the reflected IR radiation is captured in an image by the camera. The image is then processed, as explained below, to detect and recognize the presence and position of the finger within the image.

The processing includes extracting from the image one or more objects that potentially may be fingers. Each extracted object is projected into the eigenspace that was defined for the set of training images. In the eigenspace, the projection of the extracted object is represented by a single image point. The coordinates of the single image point are compared to the model of the cloud of training points to determine whether the single image point matches, or nearly matches, the model. If the single image point matches, or nearly matches, the model, the object is determined to be a finger. If the object is determined to be a finger, the position of the finger with respect to the screen or surface (for example, an (x,y) coordinate) is calculated and entered into, for example, the computer and/or software application.

According to a general aspect, coordinates for an image point in a multi-dimensional space are determined, the image point characterizing a particular object. An equation describing a model in the multi-dimensional space is provided, the model being characteristic of a set of training images of one or more other objects. The coordinates are applied to the equation to determine a distance between the image point and the model, and a determination is made as to whether the particular object matches the one or more other objects based on the determined distance.

Implementations of the above general aspect may include one or more of the following features. For example, an image of the particular object may be received. The image may have a number of data elements, and the multi-dimensional space may have a dimensionality that is lower than the number of data elements. Determining the coordinates for the image point may include projecting the image into the multi-dimensional space to produce the coordinates for the image point in the multi-dimensional space.

The model may be a model of a set of training points in the multi-dimensional space, each of the training points in the set corresponding to one or more images in the sequence of training images.

The image of the particular object may be normalized before being received. Normalizing the image of the particular object may account for variations in brightness. Normalizing the image of the object may include applying a histogram equalization technique to the image of the particular object.

The equation may describe a hyperboloid, a cone, a line, or a combination of a cone and a line. The particular object may include an object from the set consisting of a finger, a pen, and substantially cylindrical objects.

Providing the equation may include selecting the equation from among a first equation and a second equation, the first equation describing a first model characteristic of a first set of training images, and the second equation describing a second model characteristic of a second set of training images.

According to another general aspect, an image of a particular object is received, the image having a number of data points. The image is projected into a multi-dimensional space having a dimensionality that is lower than the number of data points to produce coordinates for an image point in the multi-dimensional space, where the image point characterizes the particular object. An equation describing a model in the multi-dimensional space is provided, the model being a model for a set of training points in the multi-dimensional space, and each of the training points in the set corresponding to one or more images in a training set of images of one or more other objects. The coordinates are applied to the equation to determine a distance between the image point and the model and a determination is made as to whether the particular object matches the other objects based on the determined distance.

Implementations of the above general aspect may include one or more of the following features. For example, providing the equation may include selecting the equation from among a first equation and a second equation, where the first equation describes a first model characteristic of a first set of training images, and the second equation describes a second model characteristic of a second set of training images.

According to another general aspect, a system includes a camera and a processing device coupled to the camera. The processing device is configured to determine coordinates for an image point in a multi-dimensional space, the image point characterizing a particular object. The processing device is also configured to provide an equation describing a model in the multi-dimensional space, the model being characteristic of a set of training images of one or more other objects. The processing device is further configured to apply the coordinates to the equation to determine a distance between the image point and the model and to determine whether the particular object matches the one or more other objects based on the determined distance.

Implementations of the above general aspect may include one or more of the following features. For example, the camera may be an IR camera. The system may include an IR source. The system may include a screen disposed in front of the camera. The screen may be at least translucent such that light reflected by an object disposed on a side of the screen opposite the camera can pass through the screen and be received by the camera.

According to another general aspect, a tool is provided for determining coordinates for a particular image point in a multi-dimensional space, the particular image point characterizing a particular object. The tool also provides an equation describing a model in the multi-dimensional space, the model being characteristic of a set of training images of one or more other objects. The tool is also provided for applying the coordinates to the equation to determine a distance between the particular image point and the model, and to determine whether the particular object matches the one or more other objects based on the determined distance.

Implementations of the above general aspect may include one or more of the following features. For example, the set of training images may be received, each of the images in the set having a number of data elements. The multi-dimensional space may be determined based on the set of training images and the multi-dimensional space may have a dimensionality that is lower than the number of data elements. A set of training points may be generated by projecting each image in the set of training images into the multi-dimensional space to produce coordinates for a corresponding training point in the multi-dimensional space. Each training point in the set of training points may correspond to at least one of the images in the set of training images. The equation describing the model in the multi-dimensional space characteristic of the set of training images may be determined.

Each image in the set of training images may be normalized before being received. Normalizing each image in the set of training images may account for variations in brightness. Normalizing each image in the set of training images may include applying a histogram equalization technique to each image in the set of training images.

The various aspects, implementations, and features may be implemented using, for example, one or more of a method, an apparatus, an apparatus or tool or processing device for performing a method, a program or other set of instructions, an apparatus that includes a program or a set of instructions, and a computer readable medium. The computer readable medium may include, for example, instructions, software, images, and other data.

The details of one or more implementations are set forth in the accompanying drawings and the description below. Other features will be apparent from the description and drawings, and from the claims.

DESCRIPTION OF DRAWINGS

The patent or application file contains at least one drawing executed in color. Copies of this patent or application publication with color drawing(s) will be provided by the Office upon request and payment of the necessary fee.

FIG. 2(b) is a sample shadow matrix providing an illustration of the two extracted objects from the sample image of FIG. 2(a).

DETAILED DESCRIPTION

Systems and methods for detecting and recognizing fingers touching or moving near a surface are disclosed. These systems and methods may also be used to detect and recognize other objects touching or moving near a surface. Furthermore, these systems and methods may also be used to detect and recognize objects in a field of vision absent a surface. More generally, these systems and methods may be used to detect and recognize objects in an image.

Figure 1:
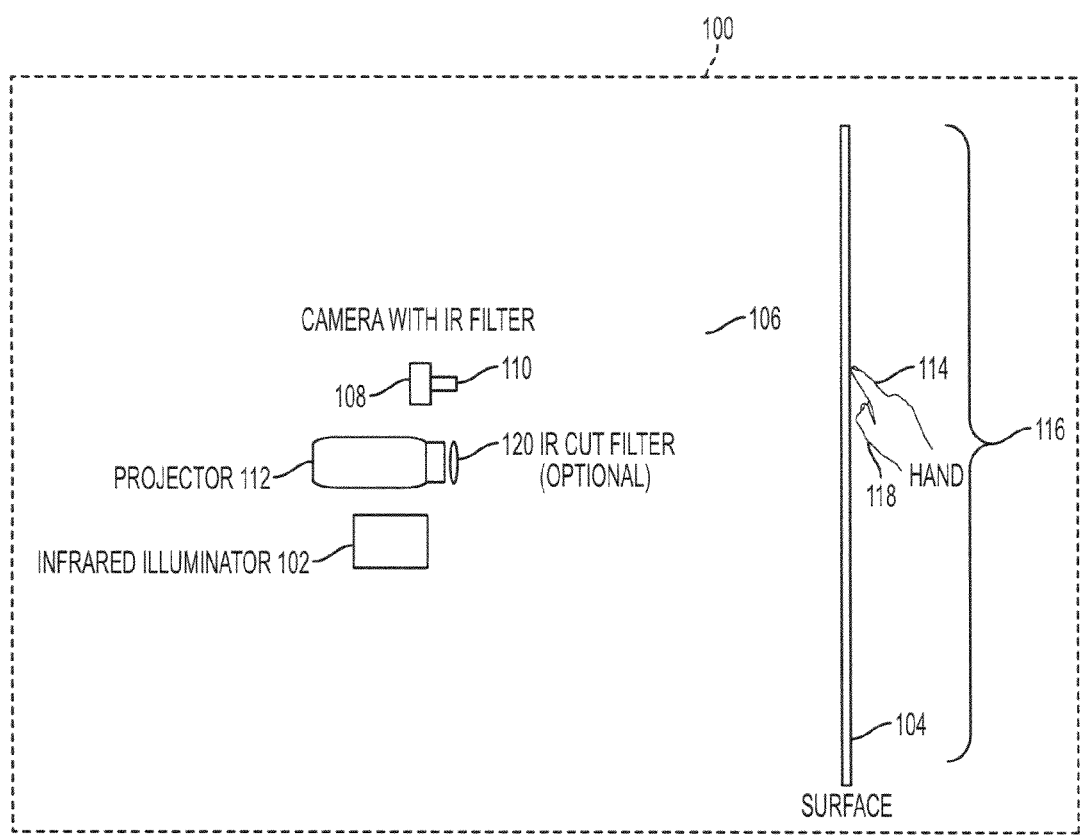
FIG. 1 is an illustration of one system for recognizing and tracking fingers.

FIG. 1 is an illustration of an exemplary system 100 for recognizing and tracking one or more fingers. An infrared (IR) illuminator 102 positioned behind a surface 104 illuminates an area 106 that extends both behind and in front of the surface 104. A camera 108 equipped with an IR filter 110 is positioned behind the surface 104 and captures images of, for example, the surface 104 and its vicinity. An image captured by the camera 108 may be represented digitally by data elements (e.g., pixels). A projector 112 positioned behind the surface 104 may project a computer-user interface on the surface 104. The computer-user interface projected on the surface 104 may be a conventional computer display. The projector 112 may project IR in addition to visible light. Therefore, the projector 112 may be equipped with an optional IR filter 120 to reduce or eliminate the IR projected by the projector 112.

The techniques and apparatus disclosed may allow a user to interact with the computer-user interface using hand gestures. For example, the position of a user's finger 114 may be tracked, allowing the user to control the location of the mouse pointer on the computer-user interface by touching the surface 104 with his/her finger 114 or by moving his/her finger 114 near the surface 104. The position of the user's finger 114 may be used, for example, to represent the desired location of the mouse pointer. In some implementations, in order to accurately discern the position of the user's finger 114, it may be desirable to distinguish the user's finger 114 from the user's palm 118.

The system 100 illustrated in FIG. 1 is merely an example of one implementation and other configurations are possible. An image captured by the camera 108 may be generated by capturing light reflected by objects. Light may include IR, visible light, ultra-violet, or any other form of electromagnetic radiation. Thus, an IR illuminator 102 may not be required. Other light sources may be substituted for the IR illuminator. In an alternative implementation, no light source may be required. Instead, the system 100 may rely solely on reflected ambient light. Furthermore, the camera 108 is not required to be positioned behind the surface 104. For example, the camera 108 may be positioned anywhere else in the system 100 deemed advantageous. In addition, the system 100 need not be implemented to facilitate human-computer interaction. Instead, in one implementation, the system 100 may be used to detect objects within images captured by a camera 108. In such an implementation, a surface 104 may not be required.

In general, many processing operations may be involved in detecting and recognizing an object in an image as a finger. For example, the system 100 first may be trained to recognize an object as a finger. The training stage may involve capturing a set of training images of one or more fingers positioned in one or more orientations and building a model of the set of training images. In the recognition stage, the system 100 may capture an image, extract an object from the captured image, and compare the extracted object to the model of the set of training images generated during the training stage to determine if the extracted object is a finger. Processing that may be involved in detecting and recognizing an object in an image as a finger is described in greater detail below.

A region of interest (ROI) 116 of an image may be defined as the portion of the image that includes the surface 104. The ROI of an image 116 may be examined for the detection and recognition of one or more fingers 114. An image captured by the camera 108 may include reflections of the IR generated by the IR illuminator 102 and reflected by one or more fingers within the ROI 116, or the IR may be reflected by one or more other objects within the ROI 116. For example, the surface 104 may reflect IR.

In order to account for the IR consistently reflected by the surface 104 or other objects within the ROI 116, a background model (BGM) of the IR consistently reflected by the surface 104 or other objects within the ROI 116 may be created and subtracted from each image captured by the camera 108. Subtracting the BGM from each image captured by the camera 108 may effectively exclude, or at least reduce, IR attributable to background objects that is processed from a captured image. Consequently, subtracting the BGM from each image may enhance the contrast between an object of interest within the ROI 116 and the surface 104 and/or other objects consistently within the ROI 116.

The BGM may be created by capturing a number of images of the ROI 116 with no objects of interest present and then averaging the captured images pixel by pixel to create a new, average image, or BGM. The BGM then may be subtracted from each image captured by the camera 108. This process may be described by the equation:

$$J(x, y) = \begin{cases} 0 & \text{if } |I(x, y) - B(x, y)| < \varepsilon \\ |I(x, y) - B(x, y)| & \text{otherwise} \end{cases} \quad (1)$$

where I is an image, B is the BGM, ε is an adjustable threshold (for example, an adjustable constant), and J is the resulting image. The BGM may be updated, for example, randomly, periodically, or upon the occurrence of a triggering event.

Figure 2A:
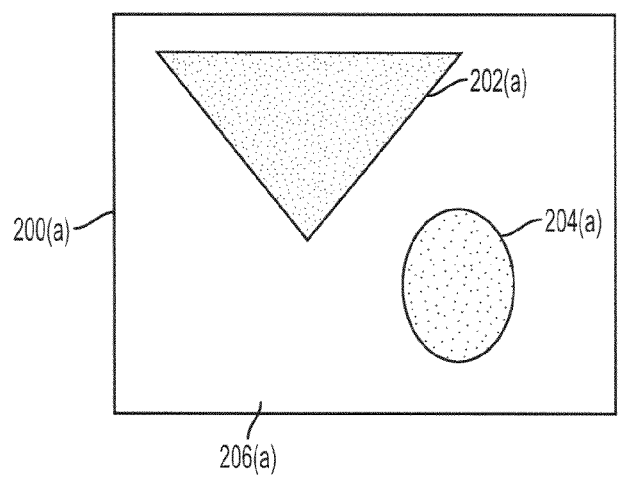
FIG. 2(a) is a sample image illustrating two objects within an image.
Figure 2B:
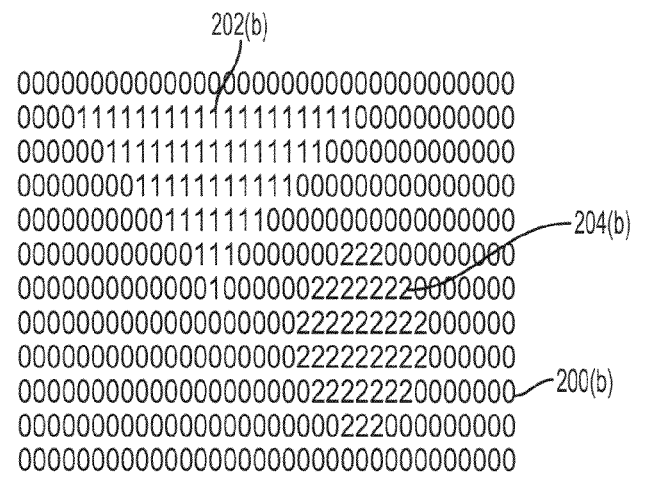
Figure 3:
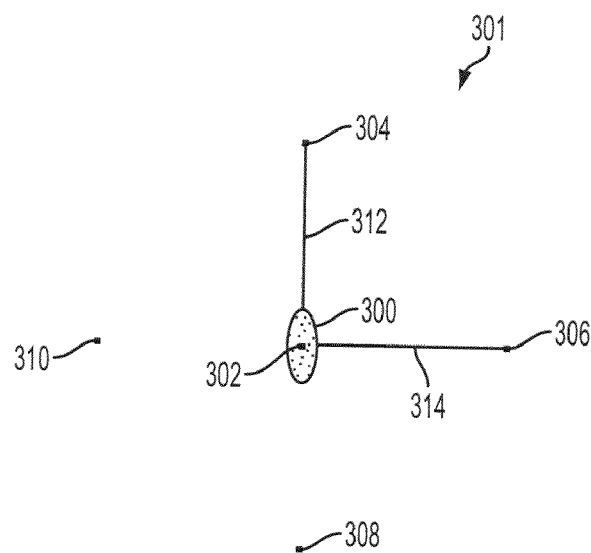
FIG. 3 illustrates a diagram for determining if an object extracted from an image is too large to be an object of interest.

Referring to FIGS. 2(a), 2(b), and 3, examples of processes for detecting the presence of an object within an image and making an initial determination of whether the object is an object of interest are illustrated.

In particular, FIG. 2(a) illustrates two objects 202(a), 204(a) within a sample image 200(a). As illustrated in FIG. 2(a), objects 202(a) and 204(a) are shown as darker than the background 206(a). However, in an image 200(a) formed by light reflected by two objects 202(a), 204(a), the two objects 202(a), 204(a) would be expected to be brighter than the background 206(a). Thus, it should be appreciated that the image 200(a) of FIG. 2(a) is merely an example of two objects 202(a), 204(a) in an image 200(a) and that the image 200(a) is not intended to suggest that objects in an image will be darker than the background of the image.

In order to extract the objects 202(a), 204(a) from the image 200(a), a blob analysis algorithm, such as the Grassfire algorithm, may be employed. The Grassfire algorithm is described in, for example, Pitas I., *Digital Image Processing Algorithms*, Prentice-Hall, N.Y. (1993). Other algorithms for detecting the presence of an object within an image and extracting the object from the image may be employed.

The Grassfire algorithm may search an image for objects and identify each pixel of each object it detects with a common label. In particular, in an image formed by light reflected by objects in which the objects are brighter than the background, the Grassfire algorithm may determine the brightest pixel in the image. For example, the image may be a grayscale image with 256 possible values for each pixel. That is, each pixel may be assigned a value from 0-255 with zero representing the least bright pixel possible (e.g., absolute black) and 255 representing the brightest pixel possible (e.g., absolute white). The brightest pixel in the image may have a value of 220. The Grassfire algorithm may compare each pixel in the image against an adjustable threshold constant relative to the brightest pixel in the image to determine whether the pixel corresponds to an object. For example, the adjustable threshold value may be 50. Therefore, the Grassfire algorithm may consider any pixel in the image within 50 shades of the brightest pixel as representing an object. That is, any pixel with a value within the acceptable range 170-220 may be considered as representing an object. The Grassfire algorithm then may consider any set of adjacent pixels falling within the acceptable range as constituting an object.

The Grassfire algorithm may produce a matrix called a shadow matrix that is the same size as the original image. Elements of the shadow matrix that correspond to pixels identified as representing an object in the original image may be identified by common labels. FIG. 2(b) illustrates an example of a shadow matrix 200(b) corresponding to the sample image 200(a) illustrated in FIG. 2(a). Object 202(a) in sample image 200(a) is represented by object 202(b) in shadow matrix 200(b) and each element of object 202(b) is identified with a common label "1." Similarly, object 204(a) in sample image 200(a) is represented by object 204(b) in shadow matrix 200(b) and each element of object 204(b) is identified with a common label "2." As illustrated in FIG. 2(b), the Grassfire algorithm may effectively extract objects 202(a) and 204(a) from sample image 200(a).

Referring again to FIG. 1, ideally, if finger 114 is touching the surface 104 or moving near the surface 104, then finger 114 would produce the brightest object in an image. Unfortunately, finger 114 touching the surface 104 or moving near the surface 104 may not always produce the brightest object within an image. For example, when a user touches the surface 104 with his/her finger 114, the user's palm 118 may reflect enough IR radiation to appear as a bright object in an image. Other objects, such as, for example, a long sleeve, also may reflect enough IR radiation to appear as bright objects in an image. Some objects may reflect more IR radiation than the user's finger 114 and consequently may appear as brighter objects in an image than the user's finger 114.

Therefore, in one implementation, several objects in an image—not just the brightest object—may be extracted from the image. However, processing many objects within an image for recognition may require extensive processing power and may be time consuming. Therefore, techniques may be applied to reduce the number of extracted objects that are processed for recognition. An extracted object may exhibit features that make it unlikely that it is a finger and therefore may be discarded. One criterion that may be used to sort extracted objects may be size. For example, an extracted object may be too large to be a finger. Similarly, an extracted object may be too small to be a finger.

FIG. 3 is a diagram 301 that is used to illustrate an example of a process for determining if an object 300 extracted from an image is too large to be a finger. One or more pixels within four sampling areas 304, 306, 308, 310 surrounding the center 302 of an extracted object 300 may be sampled. The distance between the center 302 of an extracted object 300 and the sampling areas 304, 306, 308, 310 may be, for example, an adjustable constant. As shown in FIG. 3, two sampling areas 304, 308 surrounding the center 302 of the extracted object 300 may be located on a vertical line 312 passing through the center 302 of the extracted object 300. Similarly, two sampling areas 306, 310 surrounding the center 302 of the extracted object 300 may be located on a horizontal line 314 passing through the center 302 of the extracted object.

Due to the fact that an image of a finger 114 may sometimes include a tail (see, e.g., FIG. 5), the sampling areas 304, 306, 308, 310 may be considered in pairs. For example, the two sampling areas 306, 310 located on the horizontal line 314 passing through the center 302 of the extracted object 300 may be considered as a first pair. Similarly, the two sampling areas 304, 308 located on the vertical line 312 passing through the center 302 of the extracted object 300 may be considered as a second pair.

If the sum of the pixel values within the first pair of sampling areas 306, 310 exceeds an acceptable threshold level, it may be determined that the sampling areas 306, 310 are part of the extracted object 300. If the sum of the pixel values within the first pair of sampling areas 306, 310 exceeds the acceptable threshold level, the sum of the pixel values within the second pair of sampling areas 304, 308 then may be compared to the acceptable threshold level.

If the sum of the pixel values within the second pair of sampling areas 304, 308 exceeds an acceptable threshold level, it may be determined that the sampling areas 304, 308 are part of the extracted object 300. If the sum of the pixel values within the first pair of sampling areas 306, 310 exceeds the acceptable threshold level and the sum of the pixel values within the second pair of sampling areas 304, 308 exceeds the acceptable threshold level, the object may be determined to be too large to be a finger and consequently the object may be discarded.

Similarly, objects extracted from an image may be too small to be a finger. The number of pixels representing each extracted object may be counted. If the number of pixels representing an object is less than a threshold constant, the object may be determined to be noise, or some other object, and consequently the object may be discarded.

Recognizing an image in an object as a finger may involve a training stage and a recognition stage. In the training stage, the system 100 may be trained to recognize an object by exposing the system 100 to a large set of training images of the object to be recognized. The set of training images may contain images of the object to be recognized positioned in various different orientations. During the recognition stage, the system 100 may detect an object in an image and compare the object to the set of training images, or a model of the set of training images, to determine whether the object is the object to be recognized.

In one implementation, during the training stage, a large number of images of one or more fingers positioned in various different orientations are captured. The covariance matrix of the set of training images is determined and a selected set of eigenvectors of the covariance matrix is used to define an eigenspace. Any number of eigenvectors may be selected to define the eigenspace. The dimensionality of the eigenspace is defined by the number of eigenvectors selected to define the eigenspace. For example, a three-dimensional eigenspace is defined by selecting three eigenvectors, for example, the eigenvectors corresponding to the three largest eigenvalues. Each training image from the set of training images is projected into the three dimensional eigenspace, creating a collection of three-dimensional points in the eigenspace. The collection of three-dimensional points in the eigenspace is modeled by a three-dimensional geometric model (e.g., a quadratic surface or line) capable of being expressed analytically by a polynomial. For example, the projection of the set of training images may form a hyperboloid-like or a cone-like surface. Additionally or alternatively, the projection of the set of training images may form a line-like geometric form in the eigenspace. In a three-dimensional space, hyperboloids, cones, and lines may be expressed analytically by polynomials. Therefore, geometric forms (also referred to as geometric models) may be used to model such a set of training images in an eigenspace.

During the recognition stage of this implementation, an object extracted from an image is projected into the eigenspace defined during the training stage. The three coordinates identifying the three-dimensional point corresponding to the projected image in the eigenspace are applied to the polynomial defining the model of the set of training images in the eigenspace to determine the distance of the projected object from the model in the eigenspace. If the projected object is within, for example, a defined distance of the model, the projected object may be determined to be a finger.

Referring now to FIGS. 5-20, implementations of the training and recognition stages are described in greater detail.

Figure 4A:
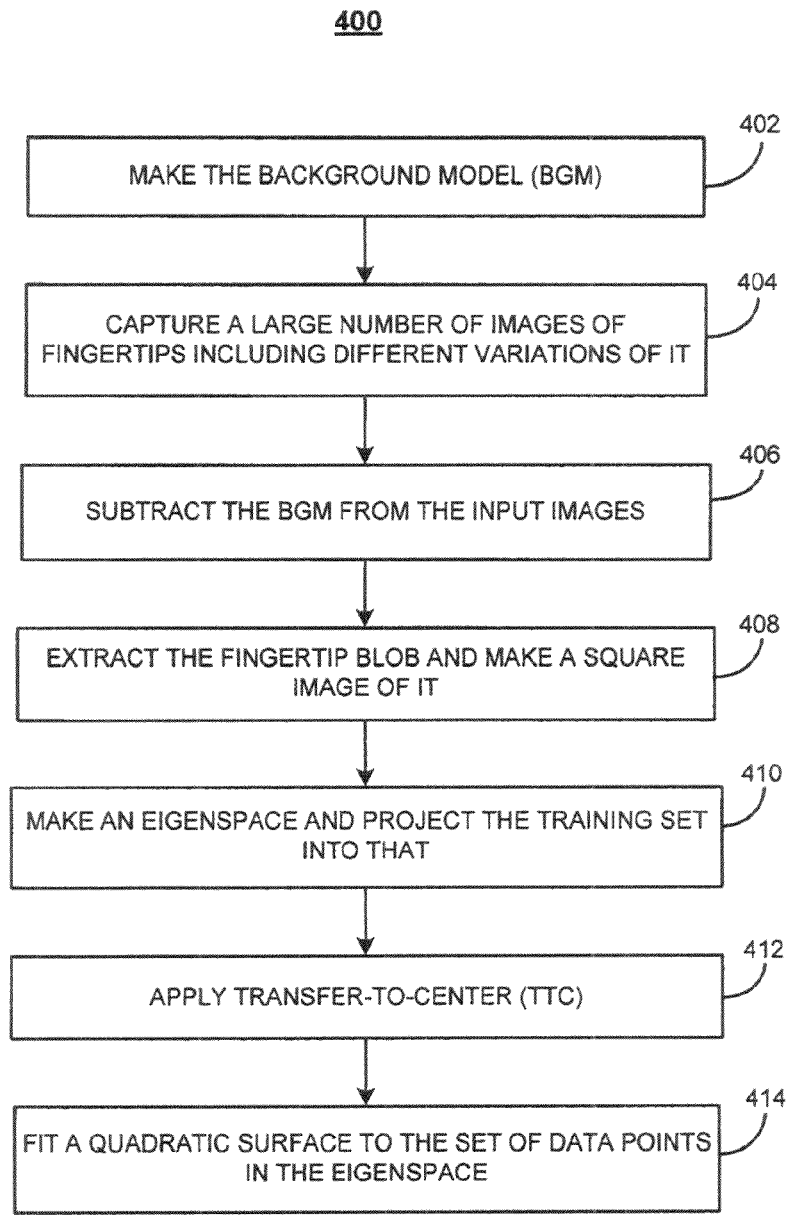
FIG. 4(a) is a process flowchart illustrating a first process for training a finger recognition and tracking system.

FIG. 4(a) is a process flow chart illustrating an exemplary process 400 for training the system 100 to recognize an object in an image as a finger. The process 400 begins by creating a BGM of the IR reflected by the surface 104 or other objects consistently within the ROI 116 (operation 402). A large number of input images of a finger 114 positioned in various different orientations then are captured by the camera 108 (operation 404). The BGM then is subtracted from each of the input images (operation 406). The portion of each image representing the finger 114 then is extracted from the image and converted into a standard n×n image size (operation 408). The portion of each image representing the finger 114 may be extracted using a blob analysis algorithm, such as the Grassfire algorithm, or the portion of each image representing the finger 114 may be extracted manually based on the visual appearance of the image. The extracted portion of the image representing the finger may include a large number of pixels. In order to reduce the computational power involved in processing the portion of the image representing the finger, it may be desirable to reduce the number of pixels used to represent the finger. Therefore, the resolution of the extracted portion of the image representing the finger may be reduced. For example, the portion of the image representing the finger in the original image may be 64 pixels by 64 pixels. After the 64×64 portion of the image representing the finger is extracted from the image, the resolution of the extracted finger may be reduced such that the finger is represented by a 16×16 image.

Figure 5:
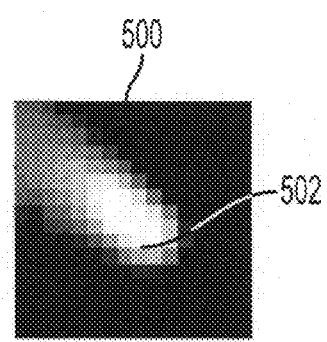
FIG. 5 is a sample image of a finger.

FIG. 5 illustrates an exemplary n×n image 500 of a finger 502.

Figure 4B:
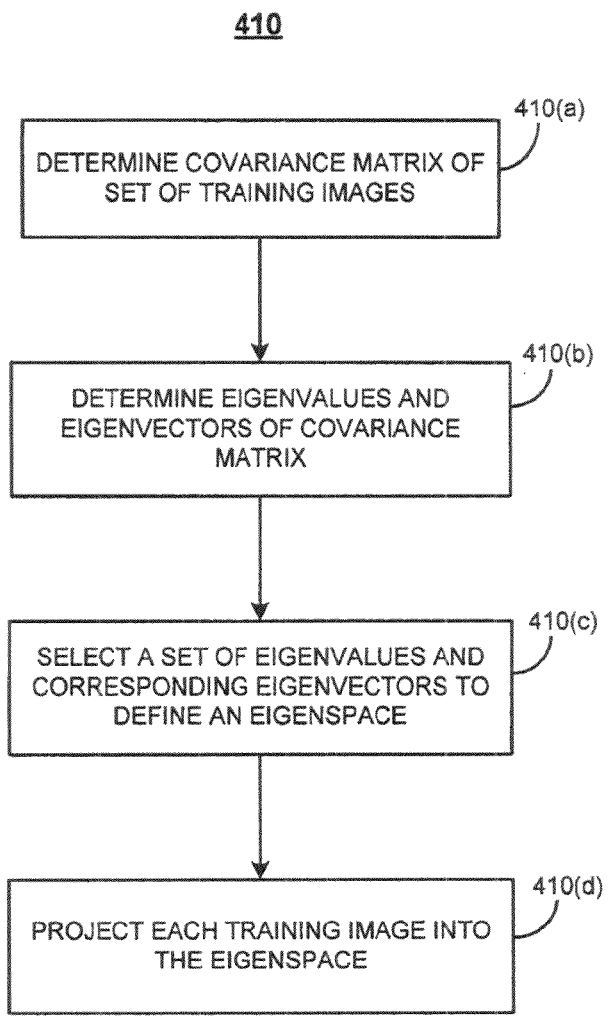
FIG. 4(b) is a process flowchart illustrating a process for performing operation 410 of FIG. 4(a).

An eigenspace for the set of n×n training images then is defined (operation 410). Operation 410 is illustrated in greater detail in FIG. 4(b). First, the covariance matrix C of the set of training images is determined (operation 410(a)). If a reshaped, n×n image, $I_{(n \times n)}$, is represented by a vector $V_{(m)}$ where $m=n^2$, the covariance matrix C of the set of t training images $\{I_1, I_2, \ldots, I_t\}$ may be defined as:

$$C = G^T G, \quad (2)$$

where G is a t×m matrix with elements $G_{i,j}=(V_{i,j}-\mu_i)$ in which $V_{i,j}$ is the jth element of vector $V_i$, the vector of the reshaped image $I_i$ of the training set, and $\mu_i$ is the mean of vector $V_i$. The covariance matrix C, therefore, is an m×m matrix. The eigenvalues and eigenvectors of the covariance matrix then may be determined (operation 410(b)). The eigenvalues and eigenvectors of the covariance matrix may be obtained by solving the equation:

$$\Delta = \Phi^T C \Phi. \quad (3)$$

where $\Delta$ is the set of eigenvalues of the covariance matrix C and $\Phi$ is the set of eigenvectors of the covariance matrix C. This process is described in U.S. Pat. No. 5,710,833.

An m×m covariance matrix will have m eigenvalues and m eigenvectors, each eigenvector corresponding to a single eigenvalue. Thus a 256×256 covariance matrix for a set of 16×16 training images will have 256 eigenvalues and 256 corresponding eigenvectors. In addition, each eigenvector will be a column vector of length 256.

All of the eigenvectors of the covariance matrix C are perpendicular to one another. Consequently, an eigenspace for the set of training images may be defined by selecting a set of eigenvectors of the covariance matrix C and using each of the selected eigenvectors to define one direction (i.e., dimension) in the space (operation 410(c)). The eigenvectors corresponding to the largest eigenvalues of the covariance matrix C indicate the directions in which the set of training images exhibit the greatest variation. Therefore, a large portion of the data contained within the set of training images may be characterized by selecting a set of eigenvectors corresponding to several of the largest eigenvectors of the covariance matrix C. In one implementation, the eigenvectors corresponding to the three largest eigenvalues of the covariance matrix C are selected to define a three-dimensional eigenspace.

After an eigenspace has been defined, each training image from the set of training images is projected into the eigenspace (operation 410(d)). Each n×n image $I_{(n \times n)}$ is converted into a vector $V_{(m)}$ where $m=n^2$. For example, if image $I_{(n \times n)}$ is a 16×16 image, vector $V_{(m)}$ is a row vector of length 256 ($m=n^2=16 \times 16=256$). The eigenspace may be defined by an m×q matrix where q is the number of eigenvectors selected to define the eigenspace and each of the q columns of the matrix represents one of the eigenvectors selected to define the eigenspace. The vector $V_{(m)}$ then may be multiplied by the m×q matrix defining the eigenspace resulting in a 1×q matrix, or row vector, wherein each element of the row vector identifies a corresponding coordinate in the eigenspace. For example, a 16×16 image $I_{(16 \times 16)}$ may be represented by a 256×1 column vector $V_{(256 \times 1)}$. If the eigenspace for the set of training images is defined by three eigenvectors, the transpose of the image vector $V_{256 \times 1}$ may be multiplied by the 256×3 matrix defining the eigenspace to obtain a 1×3 row vector defining the three coordinates of the projected image in the three-dimensional eigenspace.

Thus, the projection of an image into an eigenspace may effectively reduce the dimensionality of the image. The projection of an image in an eigenspace is a single point with as many coordinates as the dimensions of the eigenspace. For example, the projection of an image in a three-dimensional eigenspace is a three-dimensional point (i.e., the point is defined by three coordinates). Thus, when an n×n image is projected into a three-dimensional eigenspace, the image is transformed from being defined by $n^2$ pixels to being defined by a single point identified by three coordinates.

Figure 6:
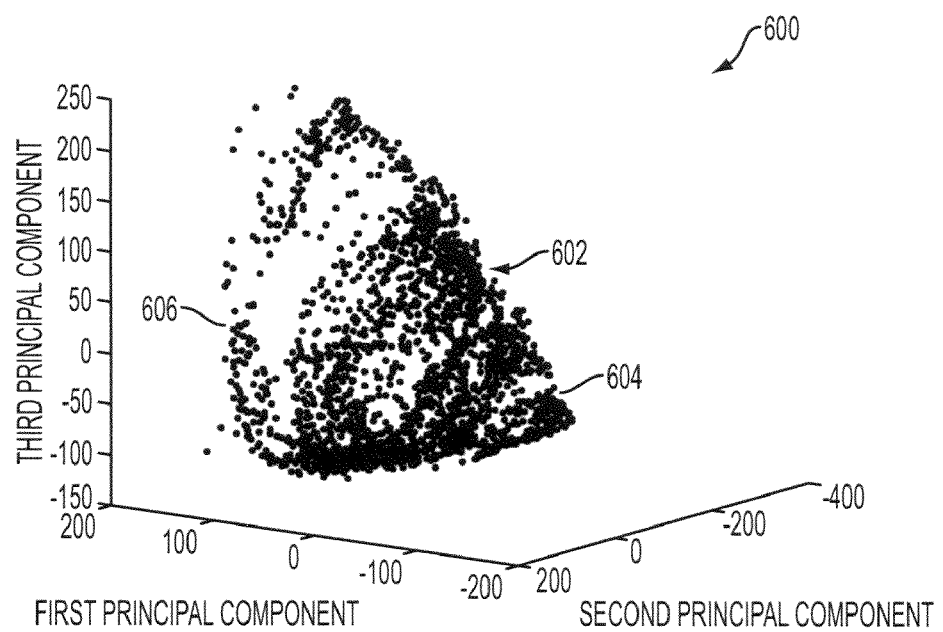
FIG. 6 is an illustration of a cloud of training points in a three-dimensional eigenspace.

FIG. 6 illustrates an example of a three-dimensional eigenspace 600 for a set of training images of one or more fingers positioned at various orientations. The projection of each image of the set of training images is represented by a three-dimensional point in the eigenspace 600. Therefore, as illustrated in FIG. 6, projecting the set of training images into the eigenspace 600 may create a cloud of training points 602 in the eigenspace 600. The cloud of training points 602 may exhibit a recognizable geometrical shape. For example, the cloud of training points 602 in FIG. 6 appears to exhibit a hyperboloid-like or cone-like shape.

The shape of the cloud of training points 602 may be a function of the special features of a finger.

When a finger 114 is perpendicular to the surface 104, the finger 114 may appear as a substantially circular object in an image captured by the camera 108. Even if the user rotates his/her hand, the finger 114 may continue to appear as a substantially circular object in an image captured by the camera 108 so long as the finger 114 remains perpendicular to the surface 104. In other words, if the finger 114 remains perpendicular to the surface 104, the shape of the finger 114 in a series of images captured by the camera 108 may exhibit only slight variations even if the hand is rotated. This process of exhibiting only slight variations may hold regardless of where, with respect to the camera 108, the finger 114 is pointing on the surface 104.

However, if the user's finger 114 is not perpendicular to the surface 104, the finger 114 may appear as a bright spot with a tail in an image captured by the camera 108. The tail may be IR reflected by the body of the finger 114. Consequently, if the hand is rotated, the angle of the tail rotates.

Figure 7A:
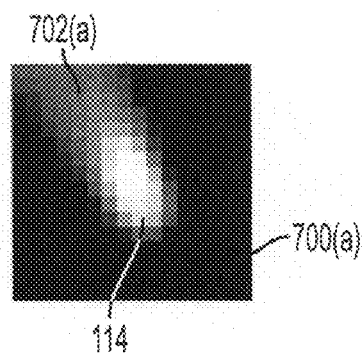
FIG. 7(a) is another sample image of a finger.
Figure 7B:
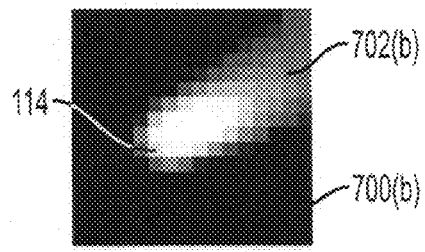
FIG. 7(b) is a sample image of the same finger as in FIG. 7(a) but with the finger having a different orientation.

FIGS. 7(a) and 7(b) are illustrative. FIG. 7(a) is an n×n image 700(a) of a finger 114 with a tail 702(a). In FIG. 7(a), the tail 702(a) is directed toward the upper left corner of the image 700(a). FIG. 7(b) is an n×n image 700(b) of the same finger 114 with a tail 702(b). In FIG. 7(b), the tail 702(b) is directed toward the upper right corner of the image 700(b). The different orientation of the tails 702(a), 702(b) may be explained by the fact that the finger 114 is oriented differently with respect to the camera 108 in the two images 700(a), 700(b). The finger 114 in image 700(a) and the finger 114 in image 700(b) form the same, non-perpendicular angle with the surface 104. However, the finger 114 in image 700(b) has been rotated from the position of the finger 114 in image 700(a) such that the finger 114 in image 700(a) and the finger 114 in image 700(b) form different angles with a plane (not shown) normal to the surface 104.

Due to the fact that the two images 700(a), 700(b) are different, they will be represented by different points in the cloud of training points 602 in the eigenspace 600. However, because the process of projecting images into an eigenspace 600 is a linear process, the projection of a set of images capturing a finger 114 with a tail of substantially the same length but with different angles of rotation may result in a set of points aligned in a substantially circular pattern (not shown) in the eigenspace 600. Therefore, while the two images 700(a), 700(b) will be represented by different points in the cloud of training points 602 in the eigenspace 600, they may be aligned along a substantially circular pattern within the eigenspace 600.

The length of the tail of a finger in an image may also impact the location of the projection of the image in the eigenspace 600. As described above in connection with FIGS. 7(a) and 7(b), projections of images of fingers with substantially the same tail length but different angles of rotation may be aligned in a substantially circular pattern in the eigenspace 600. The projection of a set of images of a finger 114 with the same short tail but different angles of rotation may be aligned in a substantially circular pattern with a smaller relative radius than the projection of a set of images of a finger 114 with the same long tail but different angles of rotation.

FIGS. 6, 8(a), 8(b), 9(a), and 9(b) are illustrative. The training points that form a vertex 604 of the cloud of training points 602 in FIG. 6 may be associated with training images in which the finger 114 appears as a substantially circular shape with little or no tail. In contrast, the training points that form a base 606 of the cloud of training points 602 in FIG. 6 may be associated with training images in which the finger 114 is trailed by a long tail.

Figure 8A:
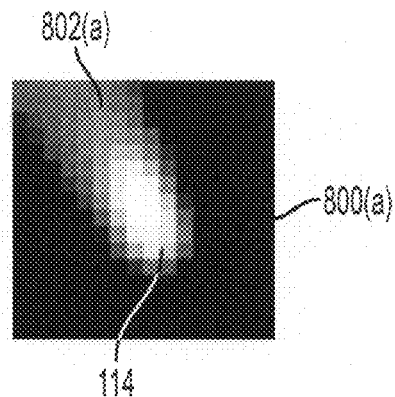
FIG. 8(a) is yet another sample image of a finger.
Figure 8B:
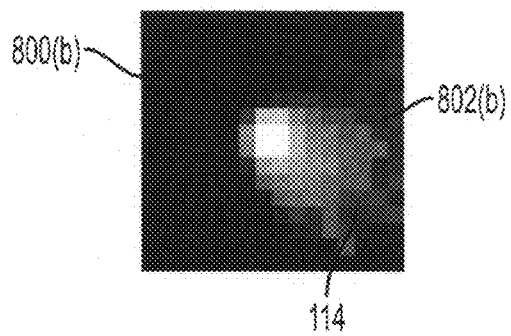
FIG. 8(b) is a sample image of the same finger as in FIG. 8(a) but with the finger having a different orientation.

FIG. 8(a) illustrates a training image 800(a) of a finger 114 with a relatively long tail 802(a) caused by a relatively small angle between the finger 114 and the surface 104. FIG. 8(b) illustrates a training image 800(b) of a finger 114 with a relatively shorter tail 802(b) caused by a relatively large angle between the finger 114 and the surface 104.

Figure 9A:
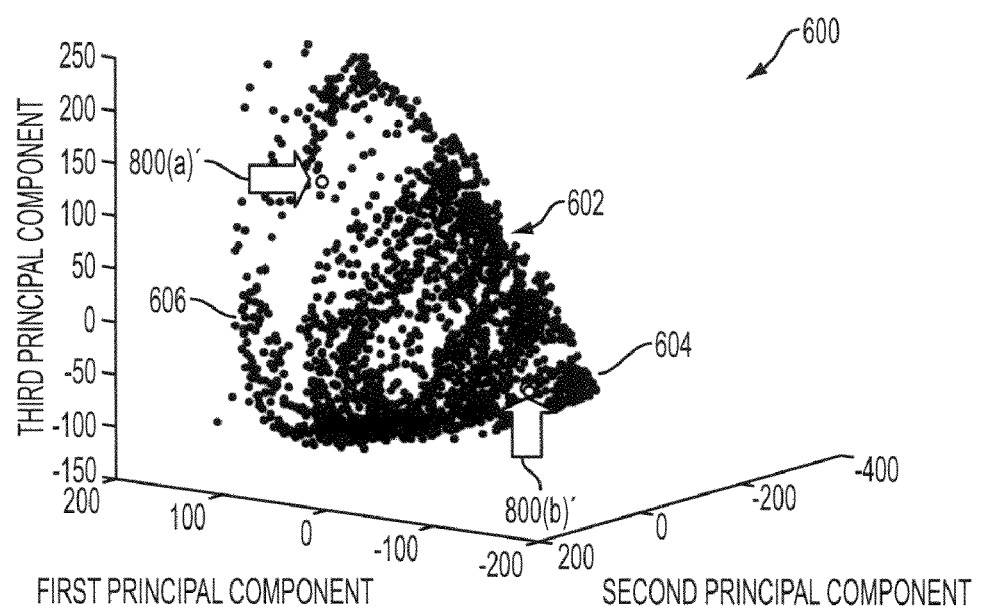
FIG. 9(a) is an illustration of a cloud of training points in a three-dimensional eigenspace.
Figure 9B:
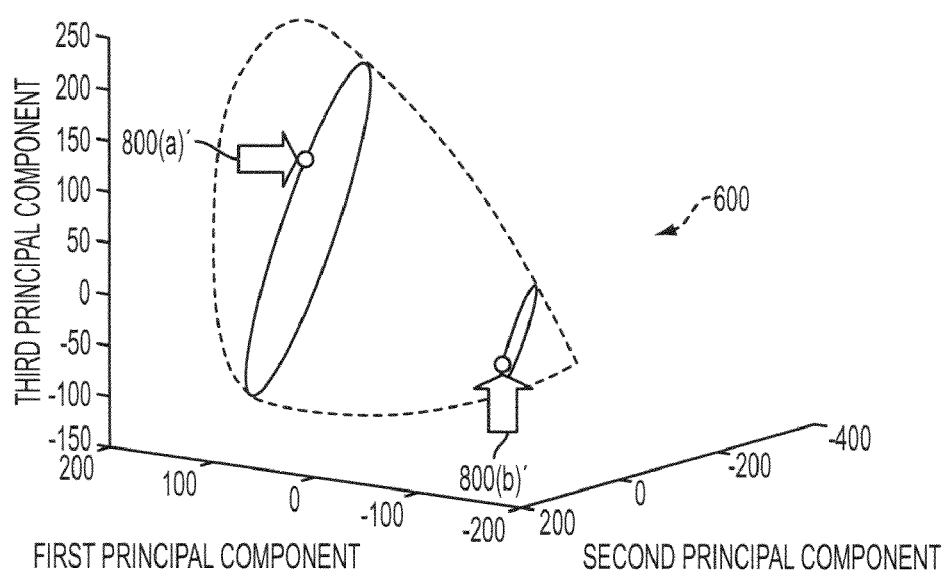
FIG. 9(b) is an illustration of the projections of the sample images of FIGS. 8(a) and 8(b) in the three-dimensional eigenspace of FIG. 9(a).

FIGS. 9(a) and 9(b) illustrate the projections 800(a)', 800(b)' of the two images 800(a), 800(b) in the three-dimensional eigenspace 600. As illustrated in FIG. 9(a), the image 800(a) of the finger 114 with the longer tail 802(a) is projected onto a point 800(a)' near the base of the cloud of training points 602 because it has a relatively long tail 802(a). In contrast, the image 800(b) of the finger 114 with the shorter tail 802(b) is projected onto a point 800(b)' near the vertex 604 of the cloud of training points 602 because it has a relatively small tail 802(b).

FIG. 9(b) illustrates the projections 800(a)', 800(b)' of the two images 800(a), 800(b) in the three-dimensional eigenspace 600 in isolation from the cloud of training points 602. As illustrated in FIG. 9(b), the projection 800(a)' is aligned in a substantially circular pattern 902 with projections of images of fingers exhibiting the same relatively long tail but different angles of rotation. Similarly, the projection 800(b)' is aligned in a substantially circular pattern 904 with projections of images of fingers exhibiting the same relatively short tail but different angles of rotation.

The cloud of training points 602 may exhibit a recognizable geometrical shape and therefore the cloud of training points 602 may be amendable to being modeled by a geometric model capable of being expressed analytically by a polynomial. In order to facilitate the fitting of a geometric model to the cloud of training points 602, a technique known as the Transfer-to-Centre (TTC) technique may be applied to each of the training points (operation 412). The TTC technique is described in, for example, Shamaie A. et. al., "International Journal of Scientia Iranica," 6(1), (1999). The TTC technique transfers the data set to the center of the eigenspace. In other words, the centroid of the data set is moved to the origin of the eigenspace.

After the TTC technique has been applied to the set of training points, a model is fitted to the cloud of training points 602 (operation 414). The general equation for a three-dimensional quadratic surface is given by:

$$F(x,y,z) = ax^2 + by^2 + cz^2 + dxy + exz + fyz + gx + hy + iz + 1 \quad (4)$$

If the cloud of points 602 defined a perfect quadratic surface, the following equation would hold for each point in the cloud 602:

$$F(x,y,z) = 0 \quad (5)$$

where x, y, and z are the coordinates of each point in the cloud of points 602. The unknown parameters of Equation 4 are $\Psi = (a, b, c, d, e, f, g, h, i)$. In order to fit a quadratic surface to the cloud of training points 602, values for the unknown parameters in Equation 4 are determined such that an error function is minimized for the set of points in the cloud of training points 602. The error function is defined by the equation:

$$E = \sum_{(x,y,z) \in TS} F^2(x, y, z) \quad (6)$$

where TS is the set of projected training points. The error function can be expanded to:

$$\sum F^2(x, y, z) = $$

$$a^2 \sum x^4 + 2ab \sum x^2 y^2 + 2ac \sum x^2 z^2 + 2ad \sum x^3 y + 2ae \sum x^3 z +$$

$$2af \sum x^2 yz + 2ag \sum x^3 + 2ah \sum x^2 y + 2ai \sum x^2 z +$$

$$2a \sum x^2 + b^2 \sum y^4 + 2bc \sum y^2 z^2 + 2bd \sum xy^3 + 2be \sum xy^2 z +$$

$$2bf \sum y^3 z + 2bg \sum xy^2 + 2bh \sum y^3 + 2bi \sum y^2 z + 2b \sum y^2 +$$

$$c^2 \sum z^4 + 2cd \sum xyz^2 + 2ce \sum xz^3 + 2cf \sum yz^3 + 2cg \sum xz^2 +$$

$$2ch \sum yz^2 + 2ci \sum z^3 + 2c \sum z^2 + d^2 \sum x^2 y^2 + 2de \sum x^2 yz +$$

$$2df \sum xy^2 z + 2dg \sum x^2 y + 2dh \sum xy^2 + 2di \sum xyz + 2d \sum xy +$$

$$e^2 \sum x^2 z^2 + 2ef \sum xyz^2 + 2eg \sum x^2 z + 2eh \sum xyz + 2ei \sum xz^2 +$$

$$2e \sum xz + f^2 \sum y^2 z^2 + 2fg \sum xyz + 2fh \sum y^2 z + 2fi \sum yz^2 +$$

$$2f \sum yz + g^2 \sum x^2 + 2gh \sum xy + 2gi \sum xz + 2g \sum x +$$

$$h^2 \sum y^2 + 2hi \sum yz + 2h \sum y + i^2 \sum z^2 + 2i \sum z + \sum 1$$

The error function may be minimized using a quasi-Newtonian method. Unfortunately, linear optimization methods, like the Quasi-Newtonian method, may stick into local minima because the error function is quadratic. However, applying the TTC technique to the set of training points before minimizing the error function reduces the risk that the quasi-Newtonian minimization method will get stuck in local minima. Therefore, the error function may converge more quickly if the TTC technique is applied to the set of training points before using the quasi-Newtonian method to minimize the error function. Minimizing the error function yields values for the set of unknown parameters $\Psi$. The values determined for $\Psi$ by minimizing the error function are plugged into Equation 4 to define a model of the cloud of training points 602.

Figure 10A:
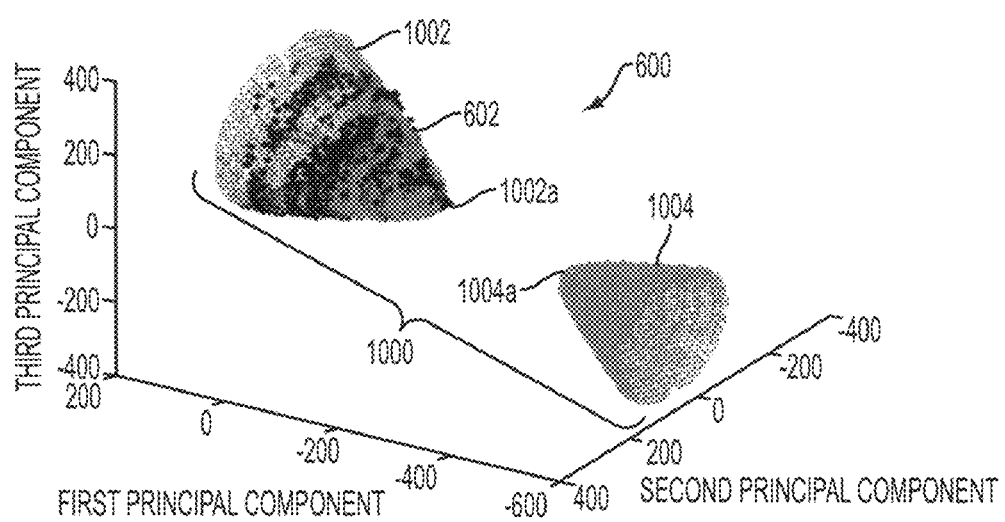
FIG. 10(a) is an illustration of the cloud of training points of FIG. 9(a) and a three-dimensional model corresponding to the cloud of image points.
Figure 10B:
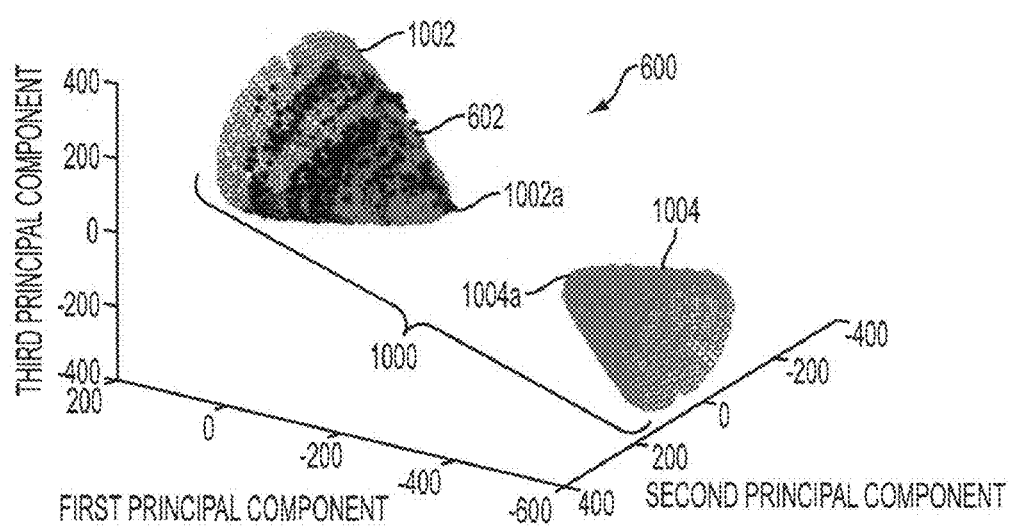
FIG. 10(b) is a color version of FIG. 10(a).

FIG. 10(a) illustrates the cloud of training points (dark points) 602 overlaying an exemplary model (empty circles) of the cloud of training points 602. FIG. 10(b) is a color version of FIG. 10(a). The model 1000 may be defined by substituting into Equation 4 the values for the set of parameters $\Psi$ determined by minimizing the error function. As illustrated in FIGS. 10(a) and 10(b), the model has a first surface 1002 and a second surface 1004 both of which appear as hyperboloid-like shapes with vertices 1002a and 1004a, respectively, facing each other, and with both surfaces lying on a common axis (not shown). In one implementation, only the first surface 1002 is used to model the cloud of training points 602. As shown in FIGS. 10(a)-(b), the cloud of training points 602 does not entirely cover first surface 1002 and does not cover second surface 1004 at all.

Figure 11A:
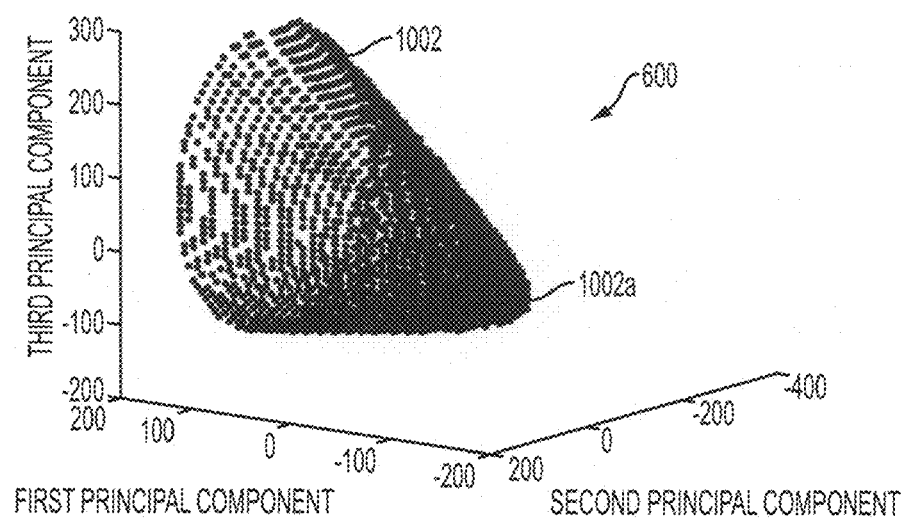
FIG. 11(a) is an illustration of a truncated model corresponding to the cloud of training points of FIG. 9(a).
Figure 11B:
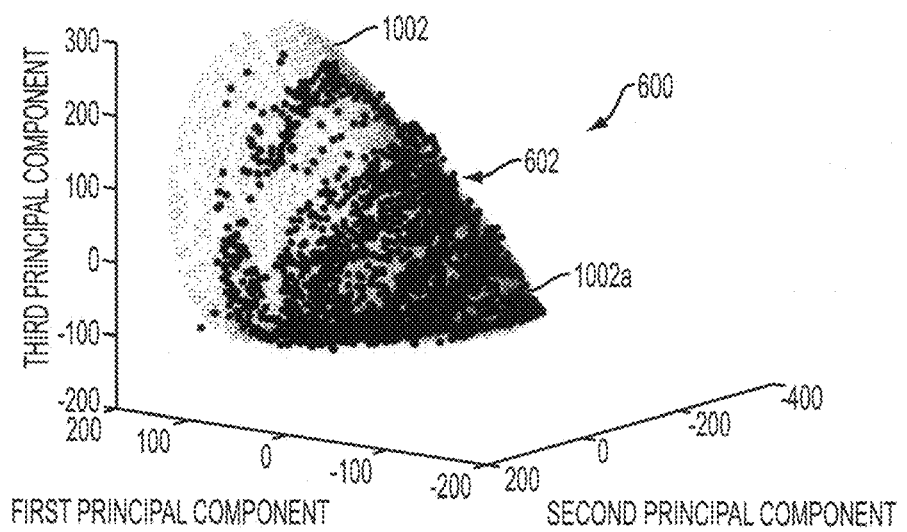
FIG. 11(b) is an illustration of the truncated model of FIG. 11(a) and the cloud of training points corresponding to the model.
Figure 11C:
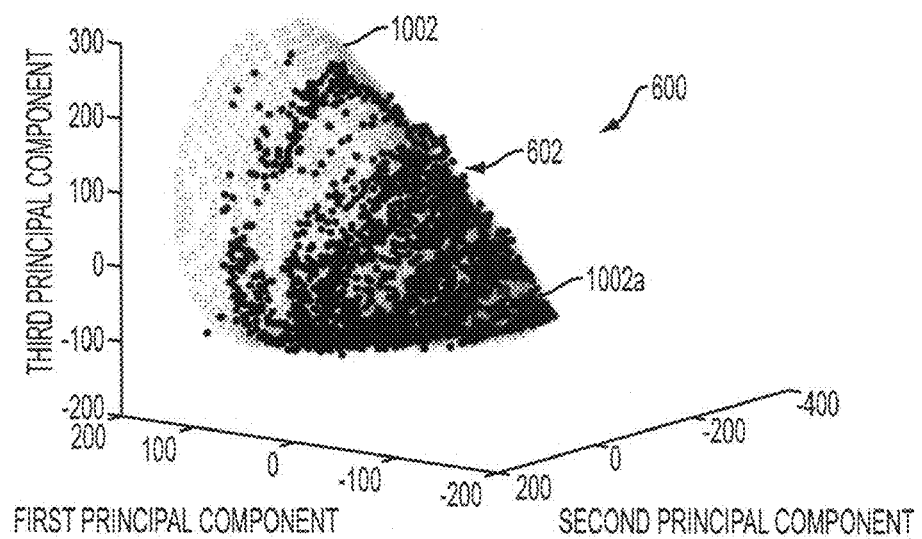
FIG. 11(c) is a color version of FIG. 11(b).

FIG. 11(a) is an illustration of the first surface 1002 of the model 1000 for modeling the cloud of training points 602 in the eigenspace 600. Second surface 1004 is not included in FIGS. 11(a)-(c). FIG. 11(b) illustrates the cloud of training points (dark points) 602 overlaying the first surface 1002 of the model (empty circles) 1000. FIG. 11(c) is a color version of FIG. 11(b).

Figure 12:
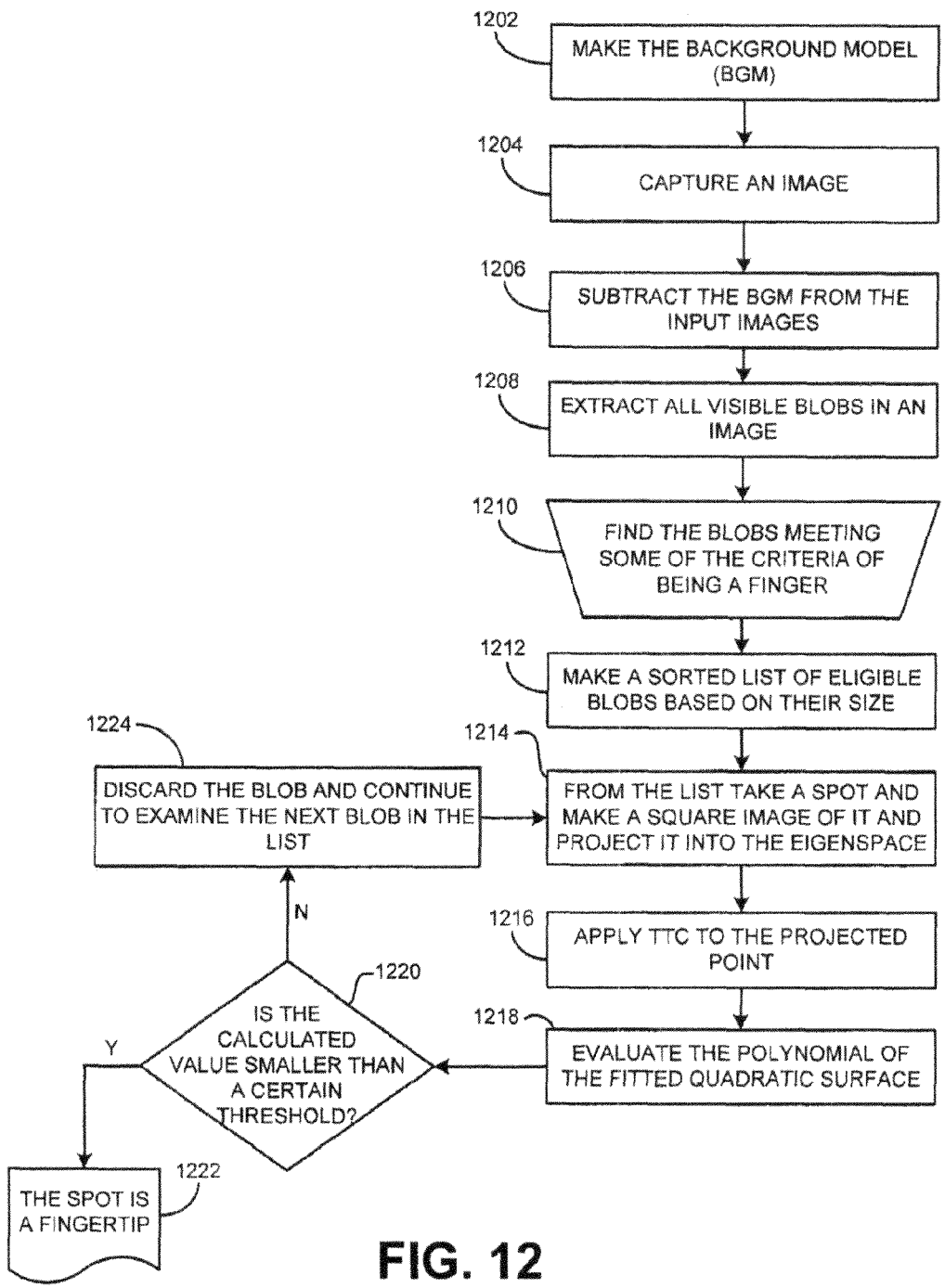
FIG. 12 is a process flowchart illustrating a process for recognizing a finger in an image using the system trained with the process of FIG. 4(a).

FIG. 12 is a process flowchart illustrating an exemplary process 1200 for recognizing an object in an image as a finger using a system trained with process 400. The process 1200 begins by creating a BGM of the IR consistently reflected by the surface 104 or other objects within the ROI 116 (operation 1202). An input image of the surface 104 and its vicinity then is captured by the camera 108 (operation 1204), and the BGM is subtracted from the input image (operation 1206).

As described in greater detail above in connection with FIGS. 2(a) and 2(b), a blob analysis algorithm, like Grassfire, is used to extract objects from the input image (operation 1208). As discussed in greater detail above in connection with FIG. 3, each of the objects extracted from the input image is processed to identify and discard objects that are either too small or too large to be a finger (operation 1210). The remaining objects are sorted into a list in ascending order of overall area (operation 1212).

The first object in the list then is converted into an n×n image and the resized n×n image is projected into the eigenspace 600 for the set of training data to obtain an image point (operation 1214). The TTC technique is applied to the image point to mimic the application of the TTC technique to the points in the cloud of training points 602 during the training stage 400 (operation 1216). The same TTC transfer values used in operation 412 may be used in operation 1216.

The coordinates of the image point are used to evaluate the quadratic polynomial defining the model 1000 of the cloud of training points 602 (operation 1218). If the image point lies on the model 1000, applying the coordinates of the image point to the polynomial will yield a value of zero. In contrast, if the image point does not lie on the model 1000, a non-zero, real number is obtained by applying the coordinates of the image point to the polynomial. The value obtained by applying the coordinates of the image point to the polynomial represents the distance between the image point and the model 1000.

An image corresponding to an image point that is located close to the model 1000 in the eigenspace 600 may exhibit similar characteristics as the images comprising the set of training images. Accordingly, it may be the case that the closer an image point is located to the model 1000, the more likely it is that the image corresponding to the image point is a finger. Therefore, an image corresponding to an image point that is found to lie on the model 1000 or an image point that falls within a maximum threshold distance of the model 1000 may be determined to be a finger.

Therefore, the value obtained by applying the coordinates of the image point to the quadratic polynomial is evaluated to determine whether it is less than a defined threshold distance (operation 1220). If the value obtained by applying the coordinates of the image point to the quadratic polynomial is less than the threshold distance, the object corresponding to the image point is deemed to be a finger (operation 1222). If the value obtained by applying the coordinates of the image point to the quadratic polynomial is greater than the maximum threshold distance, the image corresponding to the image point is discarded and the next object in the list is processed by proceeding to operation 1214 (operation 1224).

Reducing the dimensionality of an object captured in an image by projecting the object into an eigenspace allows the object to be compared to a model of images of training objects without having to compare each pixel of the captured object with each pixel of the model. As a result, processing power and resources are spared and/or the speed of the comparison is increased.

Referring now to FIGS. 13-19, additional implementations of the training and recognition stages are described.

Figure 13:
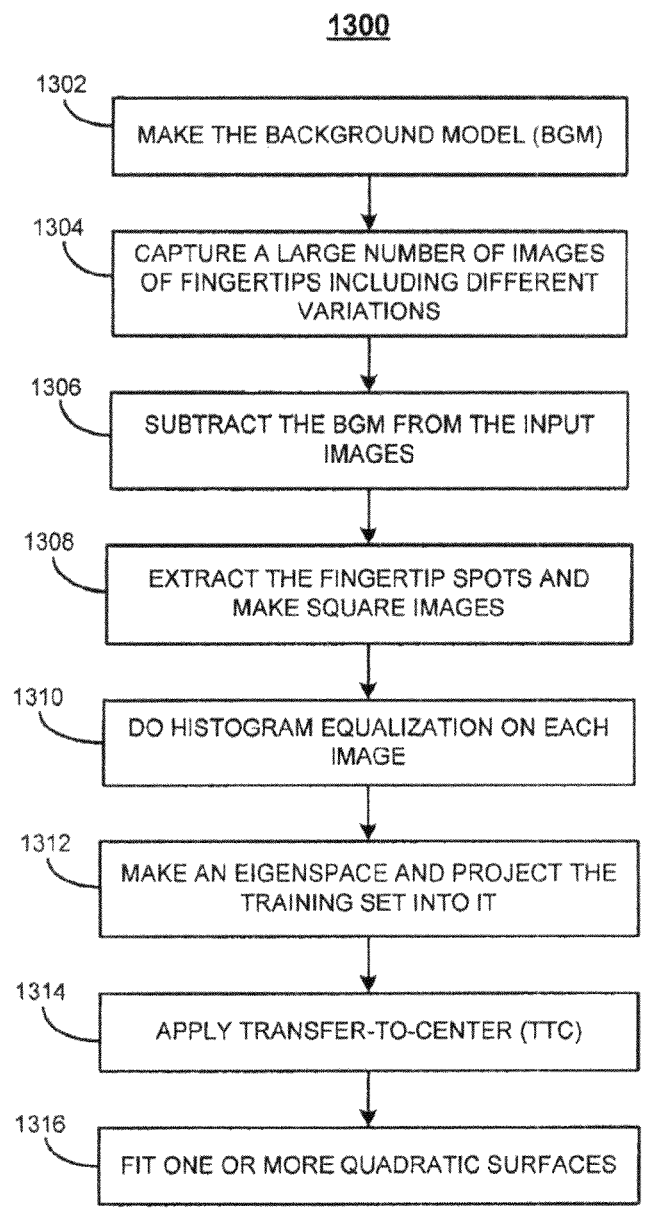
FIG. 13 is a process flowchart illustrating a second process for training a finger recognition and tracking system.

FIG. 13 is a process flowchart illustrating an example of a process 1300 for training a finger recognition and tracking system 100 to recognize an object as a finger. Process 1300 includes the operation of applying a histogram equalization technique to each training image.

The process 1300 begins by creating a BGM of the IR consistently reflected by the surface 104 or other objects within the ROI 116 (operation 1302). A large number of input images of one or more fingers positioned in various different orientations are captured by the camera 108 (operation 1304), and the BGM is subtracted from each of the input images (operation 1306). The portion of each image representing the finger is extracted from the image and converted into a standard n×n image size (operation 1308). A histogram equalization technique is applied to each n×n image (operation 1310).

The histogram equalization technique is applied to the n×n images to account for variations in lighting conditions. The application of the histogram equalization technique to an n×n image involves generating a histogram of the intensities of the pixels in the n×n image, normalizing the histogram of the n×n image, and reassigning the values of the pixels in the n×n image based on the normalized image histogram. Consequently, individual pixels retain their brightness order (e.g., they remain brighter or darker than other pixels.

An eigenspace corresponding to the set of n×n training images of the finger is created and each training image is projected into the eigenspace (operation 1312).

Figure 14:
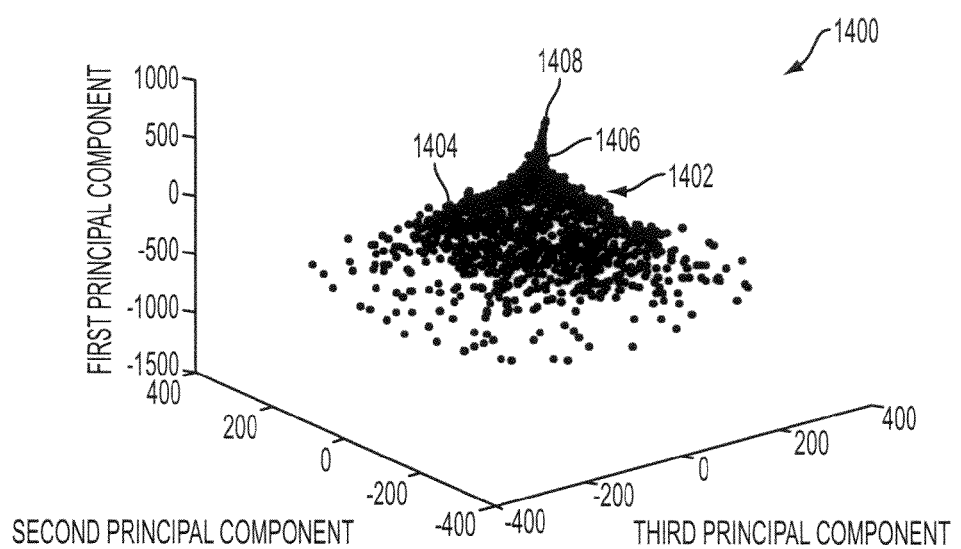
FIG. 14 is an illustration of another cloud of training points in a three-dimensional eigenspace.

As illustrated in FIG. 14, the projected training images form a cloud of training points 1402 in the eigenspace 1400. The TTC technique is applied to the cloud of training points 1402 in order to transfer the centroid of the cloud of training points 1402 to the origin of the eigenspace 1400 (operation 1314). The shape of the cloud of training points 1402 in FIG. 14 appears different than the shape of the cloud of training points 602 in FIG. 6. In particular, the cloud of training points 1402 in FIG. 14 has a tail 1406 at a vertex 1408 of a cone-like shape 1404. The difference in shape between the two clouds of training points 1402, 602 may be attributed to having applied the histogram equalization technique to the set of training images (operation 1310) because the histogram equalization technique reduces variations in the set of training images due to variations in lighting conditions. Consequently, when the training images are projected into the eigenspace 1400, a more uniform shape is obtained. The shape of the cloud of training points 602 in FIG. 6 reflects variation in lighting conditions as well as variation in finger shape and orientation within the set of training images. In contrast, the shape of the cloud of training points 1402 in FIG. 14 primarily reflects variation in finger shape and orientation within the set of training images.

Figure 15:
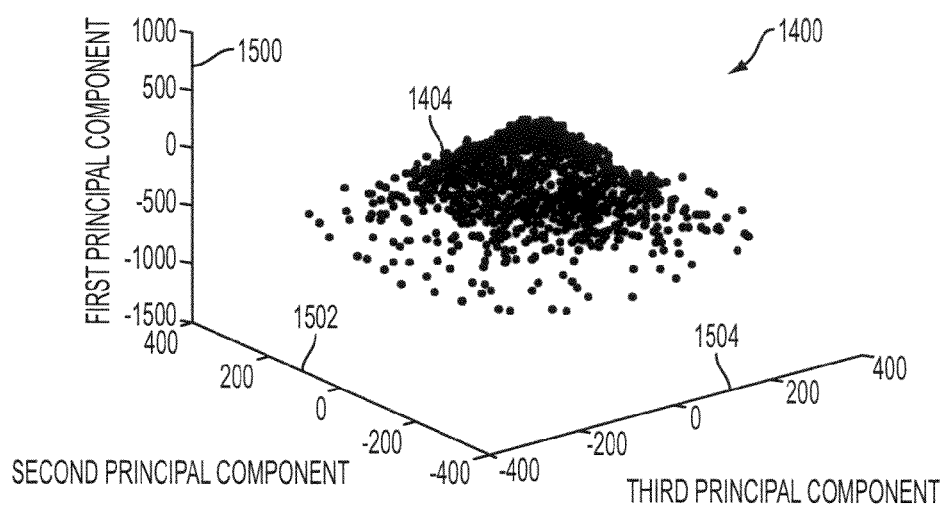
FIG. 15 is an illustration of a first subset of the cloud of training points of FIG. 14 forming a cone-like shape.
Figure 16:
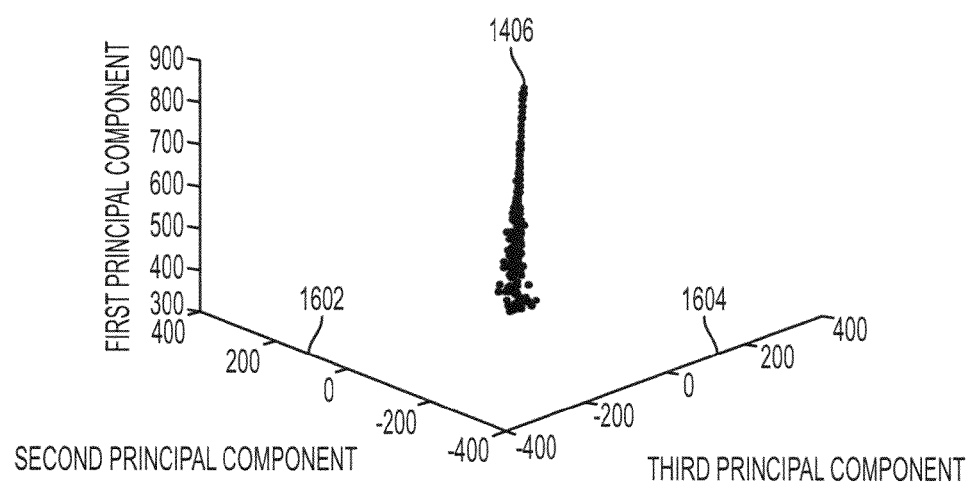
FIG. 16 is an illustration of a second subset of the cloud of training points of FIG. 14 forming a line-like shape.
Figure 17A:
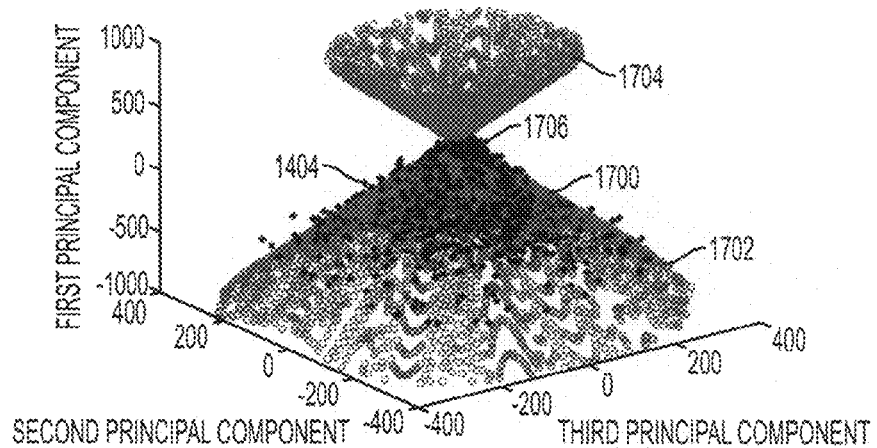
FIG. 17(a) is an illustration of the first subset of training points of FIG. 15, and a vertical cone model corresponding to the first subset of training points.
Figure 17B:
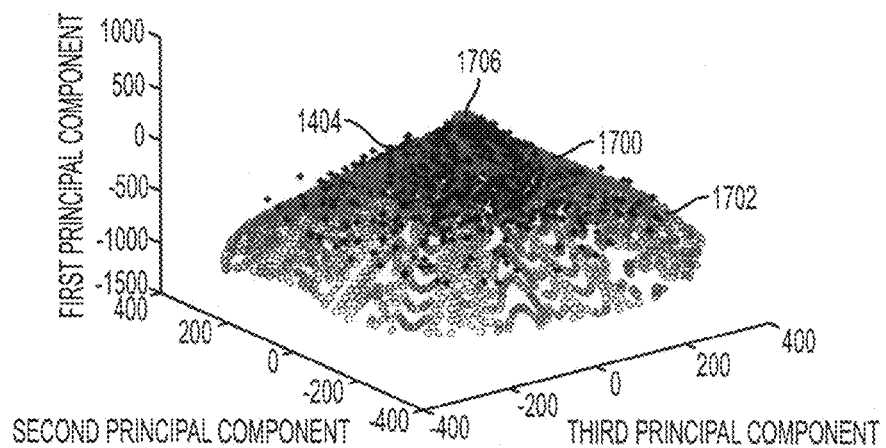
FIG. 17(b) is an illustration of the first subset of training points of FIG. 15, and a truncated vertical cone model corresponding to the first subset of training points.
Figure 17C:
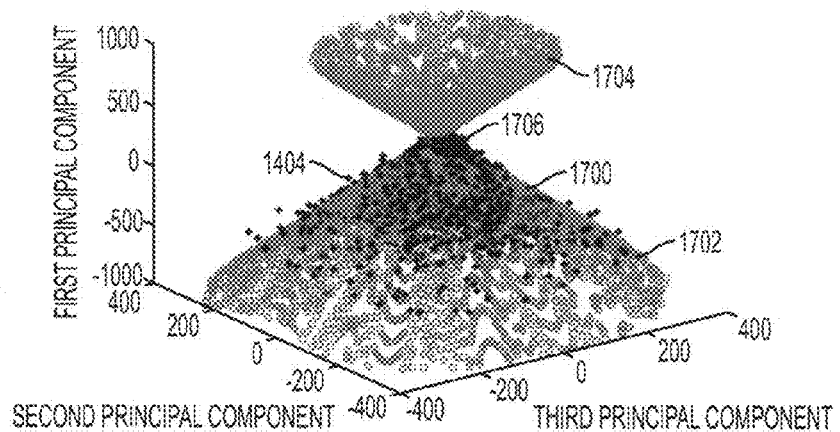
FIG. 17(c) is a color version of FIG. 17(a).
Figure 17D:
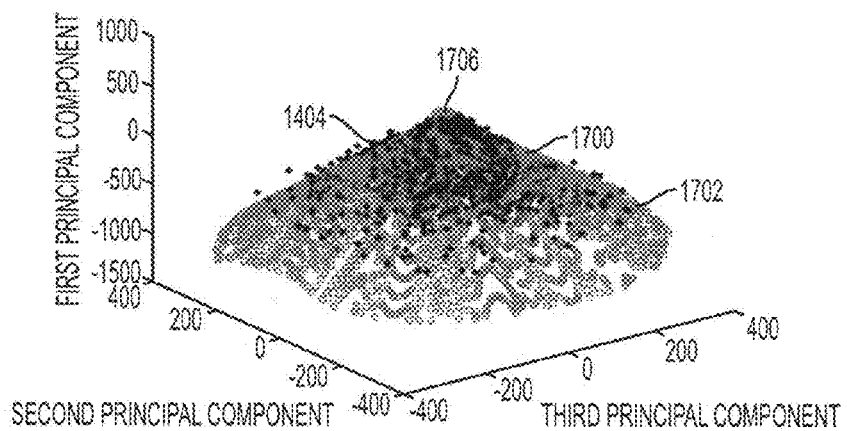
FIG. 17(d) is a color version of FIG. 17(b).

Process 1300 includes fitting one or more models to the transferred cloud of training points 1402 (operation 1316). In order to model the cloud of training points 1402, the subset of training points forming the cone-like shape 1404 and the subset of training points forming the tail 1406 are considered separately. FIG. 15 illustrates the subset of training points forming the cone-like shape 1404 without the tail 1406. FIG. 16 illustrates the subset of training points forming the tail 1406 without the cone-like shape 1404.

A model may be created of the subset of training points forming the cone-like shape 1404 and a second model may be created of the subset of training points forming the tail 1406. As discussed above, Equation 4 provides the general formula for a three-dimensional quadratic surface. Therefore, a model of the set of training points forming the cone-like shape 1404 may be determined by first determining the unknown parameters $\Psi$ of Equation 4 that minimize the error function of Equation 7 with respect to the set of points in the subset of training points forming the cone-like shape 1404. The values determined for $\Psi$ by minimizing the error function are plugged into Equation 4 to define a model of the cloud of training points 1402.

Alternatively, a vertical cone may be used to model the subset of training images forming the cone-like shape 1404. As illustrated in FIG. 15, the cone-like cloud of training points 1404 exhibits the greatest amount of variation along the vertical axis 1500 representing the first principal component of the eigenspace 1400. In other words, the height dimension of the cone-like cloud 1404 is parallel to the first principal component of the eigenspace 1400. The observation that the cone-like cloud of training points 1404 exhibits the greatest amount of variation along the first principal component of the eigenspace 1400 is consistent with the fact that the eigenvector of the covariance matrix corresponding to the first principal component represents the direction in which the set of training images exhibits the greatest variation. Therefore, it may be possible to use a vertical cone to model the subset of training points that form the cone-like shape 1404. A general vertical cone is described by the equation:

$$H(x, y, z) = \frac{(x-a)^2}{d^2} + \frac{(y-b)^2}{e^2} - \frac{(z-c)^2}{f^2} \quad (8)$$

where x and y represent the horizontal axes 1502, 1504 and z represents the vertical axis 1500 of the eigenspace 1400. The unknown parameters of Equation 8 are Ω=(a, b, c, d, e, f). In order to fit a vertical cone to the subset of training images forming the cone-like shape 1404, the values of the unknown parameters Ω that minimize Equation 8 with respect to the set of points in the subset of training points that forms the cone-like shape 1404 are determined. An error function for Equation 8 can be defined by the equation:

$$E = \sum_{(x,y,z)\in TS} H^2(x, y, z) \quad (9)$$

A quasi-Newtonian method may be used to minimize the error function of Equation 9. Minimizing the error function of Equation 9 yields values for the set of unknown parameters Ω. These values are plugged into Equation 8 to define a vertical cone model of the subset of training points forming the cone-like shape 1404.

FIG. 17(*a*) illustrates the cloud of training points of the cone-like shape (dark diamonds) 1404 overlaying an exemplary vertical cone model (empty circles) 1700 of the cloud of training points of the cone-like shape 1404. FIG. 17(*c*) is a color version of FIG. 17(*a*). As illustrated in FIGS. 17(*a*) and 17(*c*), the vertical cone model 1700 has both a bottom surface 1702 and a top surface 1704. Each surface 1702 and 1704 forms a conical shape with the two conical shapes meeting at a common vertex 1706. The two conical shapes lie on a common axis (not shown). The cloud of training points forming the cone-like shape 1404 do not completely cover surface 1702 and do not cover surface 1704 at all. In one implementation, only the lower surface 1702 of the cone 1700 is used to model the cloud of training points of the cone-like shape 1404. FIG. 17(*b*) illustrates the cloud of training points of the cone-like shape (dark diamonds) 1404 overlaying the lower surface 1702 of the exemplary vertical cone model (empty circles) 1700 of the cloud of training points of the cone-like shape 1404. FIG. 17(*d*) is a color version of FIG. 17(*b*).

Figure 18A:
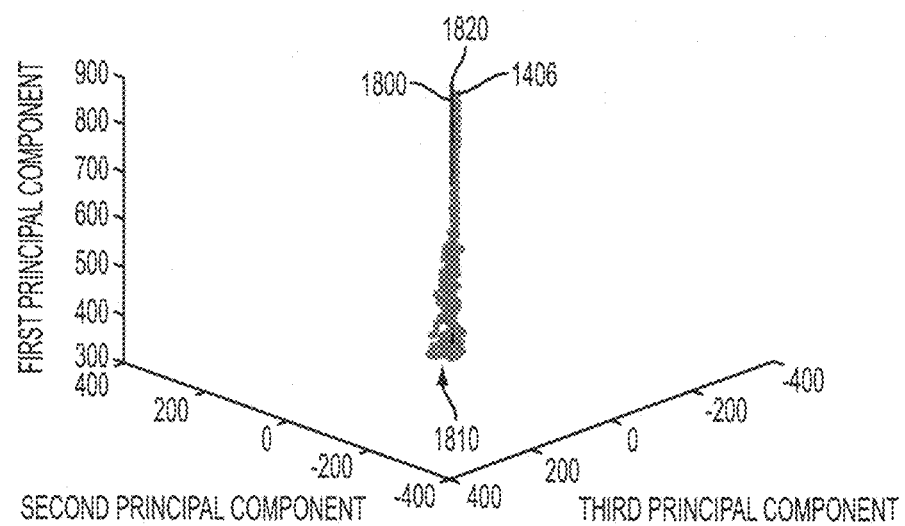
FIG. 18(a) is an illustration of the second subset of training points of FIG. 16, and a line model corresponding to the second subset of training points.
Figure 18B:
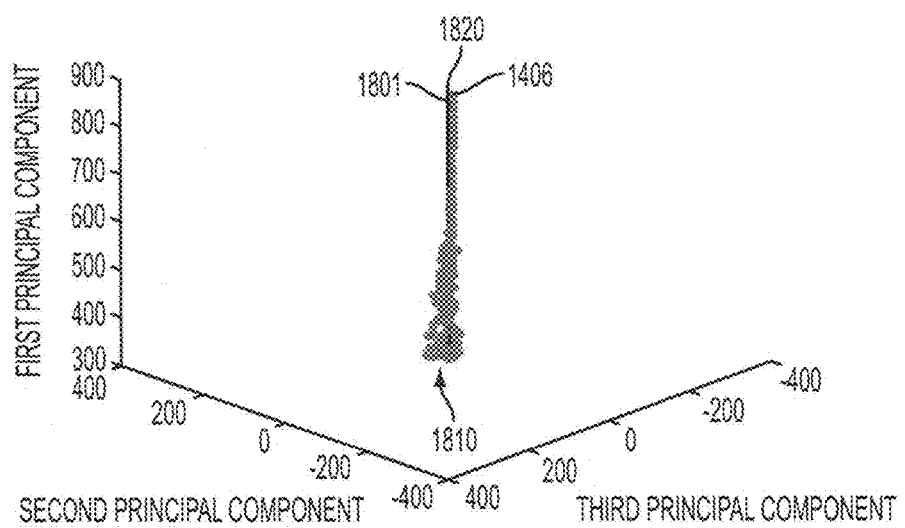
FIG. 18(b) is a color version of FIG. 18(a).

One model for the tail 1406 is a vertical line. The vertical line model of the tail 1406 is determined by calculating the mean of the training points of the tail 1406 along the horizontal axes 1602, 1604. FIG. 18(*a*) illustrates the cloud of training points of the tail (dark points) 1406 overlaying an exemplary vertical line model (dark line) 1800 of the cloud of training points forming the tail 1406. The cloud of training points forming the tail 1406 are clustered densely around a bottom portion 1810 of the line 1800 and gradually adopt a substantially linear shape nearer a top portion 1820 of the line 1800. FIG. 18(*b*) is a color version of FIG. 18(*a*). In an alternative implementation, the line 1800 may not be vertical. Instead, the line 1800 may be oriented so as to best match the set of training points forming the tail 1406.

Figure 19:
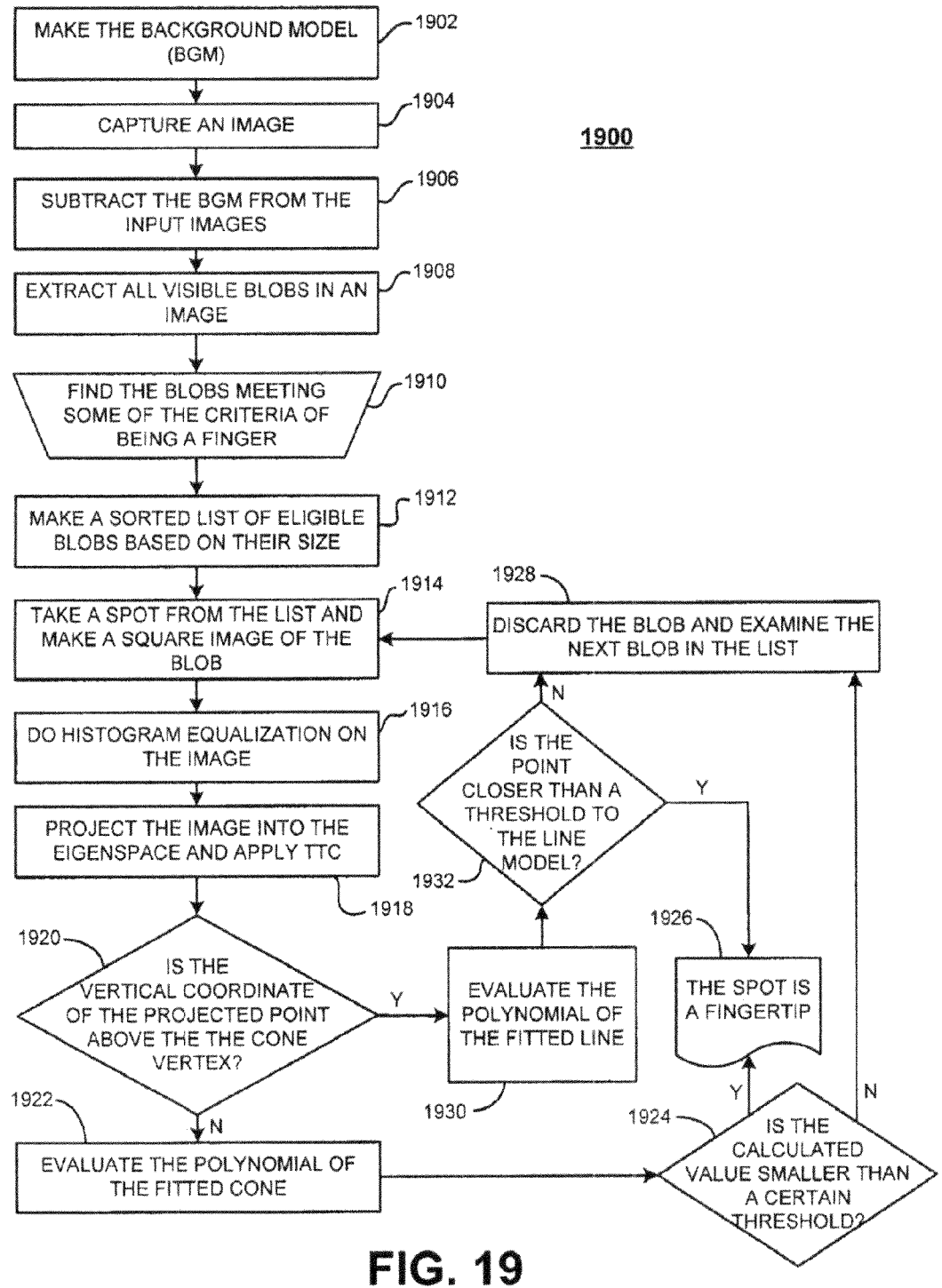
FIG. 19 is a process flowchart illustrating a process for recognizing a finger in an image using the system trained with the process of FIG. 13.

FIG. 19 is a process flowchart illustrating an example of a process 1900 for recognizing a finger in an image. Process 1900 uses a system trained with process 1300.

The process 1900 begins by creating a BGM of the IR consistently reflected by the surface 104 or other objects within the ROI 116 (operation 1902). An input image of the surface 104 and its vicinity is captured by the camera 108 (operation 1904), and the BGM is subtracted from the input image (operation 1906). As described in greater detail above in connection with FIGS. 2(*a*) and 2(*b*), a blob analysis algorithm, like Grassfire, is used to extract objects from the input image (operation 1908). As discussed above in connection with FIG. 3, each of the objects extracted from the input image is processed to identify and discard objects that are either too small or too large to be a finger (operation 1910). The remaining objects are sorted into a list in ascending order of overall area (operation 1912). The first object in the list then is converted into an n×n image (operation 1914) and the same histogram equalization technique applied in process 1300 is applied to the resized image (operation 1916). After applying the histogram equalization technique to the image, the image is projected into the eigenspace for the set of training images and the TTC technique is applied to the image point to mimic the application of the TTC technique to the points in the cloud of training points 1402 during the training stage 1300 (operation 1918).

As described above, two models, the lower surface 1702 of a vertical cone 1700 and a vertical line 1800, are used to model the cloud of training points 1402. Therefore, a determination is made as to whether the vertical coordinate of the image point is above or below the vertex 1706 of the lower surface 1702 of the vertical cone model 1700 (operation 1920).

If the vertical coordinate of the image point is below the vertex 1706 of the vertical cone model 1700, the "N" branch is followed out of operation 1920. The coordinates of the image point are used to evaluate Equation 8 defining the vertical cone model 1700 of the cone-like cloud of training points 1404 (operation 1922). If the projected point lies on the surface of the vertical cone model 1700, applying the coordinates of the projected point to Equation 8 yields a value of zero. In contrast, if the image point does not lie on the surface of the vertical cone model 1700, a non-zero, real number is obtained by applying the coordinates of the image point to Equation 8. The value obtained by applying the coordinates of the image point to Equation 8 represents the distance between the image point and the vertical cone model 1700.

An image corresponding to an image point that is located close to the lower surface 1702 of the vertical cone model 1700 in the eigenspace 1400 may exhibit similar characteristics as some of the images comprising the set of training images. Accordingly, it may be the case that the closer an image is located to the lower surface 1702 of the vertical cone model 1700, the more likely it is that the image corresponding to the image point is a finger. An image corresponding to an image point that is found to lie on the lower surface 1702 of the vertical cone model 1700 or an image point that falls within a maximum threshold distance of the lower surface 1702 of the vertical cone model 1700 may be determined to be a finger.

Therefore, the value obtained by applying the coordinates of the image point to Equation 8 is evaluated to determine whether it is less than a defined threshold distance (operation 1924). If the value obtained by applying the coordinates of the image point to Equation 8 is less than the threshold distance ("Y" branch out of operation 1924), the image corresponding to the image point is deemed to be a finger (operation 1926). If the value obtained by applying the coordinates of the image point to Equation 8 is greater than the threshold distance ("N" branch out of operation 1924), the image corresponding to the image point is discarded and the next object in the list is processed by proceeding to operation 1914 (operation 1928).

If the vertical coordinate of the image point is above the vertex 1706 of the vertical cone model 1700, the "Y" branch is followed out of operation 1920. The coordinates of the image point are used to evaluate the equation defining the vertical line model 1800 (operation 1930). If the image point lies on the line 1800, applying the coordinates of the image point to the equation defining the line will yield a value of zero. In contrast, if the image point does not lie on the line 1800, a non-zero, real number will be obtained by applying the coordinates of the image point to the equation defining the line 1800. The value obtained by applying the coordinates of the image point to the equation defining the line 1800 represents the distance between the image point and the line 1800.

An image corresponding to an image point that is located close to the vertical line model 1800 in the eigenspace 1400 may exhibit similar characteristics as some of the images comprising the set of training images. Accordingly, it may be the case that the closer an image is located to the vertical line model 1800, the more likely it is that the image corresponding to the image point is a finger. An image corresponding to an image point that is found to lie on the vertical line model 1800 or an image point that falls within a maximum threshold distance of the vertical line model 1800 may be determined to be a finger.

Therefore, the value obtained by applying the coordinates of the image point to the equation defining the line is evaluated to determine whether it is less than the threshold distance (operation 1932). If the value obtained by applying the coordinates of the image point to the equation defining the line is less than the threshold distance ("Y" branch out of operation 1932), the image corresponding to the image point is deemed to be a finger (operation 1926). If the value obtained by applying the coordinates of the image point to the equation defining the line is greater than the threshold distance ("N" branch out of operation 1932), the image corresponding to the image point is discarded and the next object in the list may be processed by proceeding to operation 1914 (operation 1928).

Various techniques exist for adjusting the threshold distance. For example, one technique for adjusting the threshold distance involves applying the coordinates of the training points to the model of the training points. A threshold distance that includes 90% of the training points is considered a reasonable choice for the threshold distance in one implementation. Of course, other threshold distances or percentages may be selected.

Figure 20:
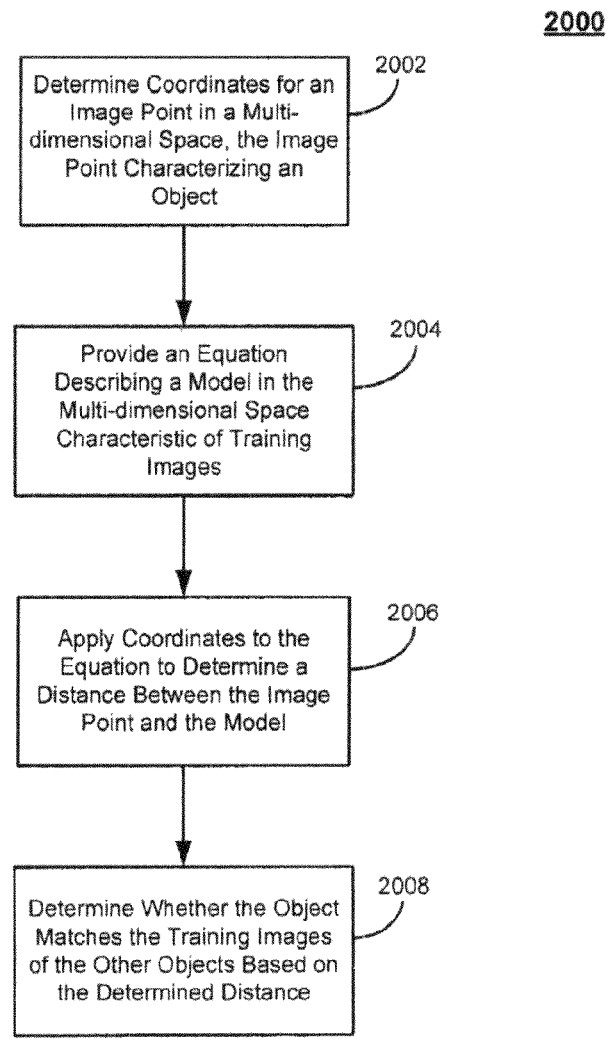
FIG. 20 is a process flowchart illustrating another process for recognizing an object in an image.

FIG. 20 is a process flowchart illustrating an example of a process 2000 for recognizing an object in an image. The process begins by determining the coordinates for an image point characterizing an object in a multi-dimensional space (operation 2002). In one implementation, an image of a particular object is captured by a camera and received as input by a computer or software application. The image point characterizes the particular object captured in the image.

An equation describing a geometric model in the multi-dimensional space that is characteristic of training images is provided (operation 2004). The coordinates for the image point are applied to the equation describing the geometric model to determine a distance between the image point and the geometric model (operation 2006).

Based on the determined distance between the image point and the geometric model, a determination is made as to whether the object characterized by the image point matches the training images (operation 2008). More specifically, the object will be determined to match, or not, whatever type of object is captured by the training images.

In one implementation, determining the coordinates for the image point involves projecting the image into a different multi-dimensional space. The multi-dimensional space may be, for example, an eigenspace. In this implementation, the geometric model that is characteristic of training images is also in the multi-dimensional space.

A number of implementations have been described. Nevertheless, it will be understood that various modifications may be made. For example, a compact disk (CD), a processing device, or other computer readable medium may contain a program, instructions, or code segments for implementing any of the methods disclosed. Furthermore, a tool may be provided for implementing any of the methods disclosed. The tool may include, for example, a computer-readable medium, a processing device, a camera, a projector, or a combination of these and possibly other components. A processing device may include, for example, a processor, a computer, a programmable logic device, or an integrated circuit.

Implementations and features may be implemented, at least in part, in a variety of devices. Examples include a computer as described above, including a portable computer or other processing device. Examples also include a portable telephone; a personal digital assistant; a messaging device such as, for example, a pager or a portable e-mail device (such as, for example, a Blackberry®); a portable music player such as, for example, an iPod®; or another electronic portable messaging, entertainment, organization, or gaming device.

In addition, while the systems and methods disclosed generally have been described in the context of recognizing an object in an image as a finger, the ability to recognize other objects in an image are contemplated. The systems and methods described may be used to recognize any object that may be modeled by a geometric model in a space, for example, an eigenspace. For example, the systems and methods described may be used to recognize an object in an image as a pen or a can. In addition, elements of different implementations may be combined, supplemented, modified, or removed to produce other implementations.

While the methods described were described as including multiple operations, additional operations may be added to the methods disclosed. Furthermore, it may not be necessary to perform each operation and some operations, therefore, may be skipped. Moreover, the disclosed operations do not necessarily have to be performed in the order in which they were described.

Finally, various technologies may be used, combined, and modified to produce an implementation, such technologies including, for example, a variety of hardware, software, firmware, integrated components, discrete components, processing devices, memory or storage devices, communication devices, lenses, filters, display devices, and projection devices. Accordingly, other implementations are within the scope of the following claims.

What is claimed is:

1. A non-transitory computer-readable storage medium encoded with executable instructions that, when executed by a processor, cause the processor to perform operations comprising:
   detecting, using electromagnetic radiation projected proximally to a surface, an object near the surface;
   determining whether the detected object is of a predetermined object type using a trained recognition model, the recognition model being trained to determine whether the detected object is of the predetermined object type based on an appearance of the detected object; and
   generating a user input to a computer application based on the detected object, if it is determined that the detected object is of the predetermined object type.

2. The computer-readable storage medium of claim 1,
wherein the electromagnetic radiation is projected onto a first side of the surface,
wherein the object is near a second side of the surface, and
wherein the first side is obverse to the second side.

3. A non-transitory computer-readable storage medium encoded with executable instructions that, when executed by a processor, cause the processor to perform operations comprising:
detecting, using electromagnetic radiation projected proximally to a surface, an object near the surface;
processing data elements of the object into a multi-dimensional space having a dimensionality that is lower than a number of data points to produce coordinates for an image point; and
generating a user input to a computer application based on the coordinates of the detected object.

4. The non-transitory computer-readable storage medium of claim 3, wherein processing data elements of the object into a multi-dimensional space having a dimensionality that is lower than a number of data points to produce coordinates for an image point comprises projecting data elements of the object into a multi-dimensional space having a dimensionality that is lower than a number of data points to produce coordinates for an image point.

5. The non-transitory computer-readable storage medium of claim 3,
wherein the electromagnetic radiation is projected onto a first side of the surface,
wherein the object is near a second side of the surface, and
wherein the first side is obverse to the second side.

6. The non-transitory computer-readable storage medium of claim 3, wherein detecting an object near the surface comprises detecting an object touching the surface.

7. A method comprising:
detecting, using electromagnetic radiation projected proximally to a surface, an object near the surface;
determining whether the detected object is of a predetermined object type using a trained recognition model, the recognition model being trained to determine whether the detected object is of the predetermined object type based on an appearance of the detected object; and
generating, using a processing device, a user input to a computer application based on the detected object, if it is determined that the detected object is of the predetermined object type.

8. The method of claim 7,
wherein the electromagnetic radiation is projected onto a first side of the surface,
wherein the object is near a second side of the surface, and
wherein the first side is obverse to the second side.

9. A method comprising:
detecting, using electromagnetic radiation projected proximally to a surface, an object near the surface;
processing data elements of the object into a multi-dimensional space having a dimensionality that is lower than a number of data points to produce coordinates for an image point; and
generating, using a processing device, a user input to a computer application based on the coordinates of the detected object.

10. The method of claim 9, wherein processing data elements of the object into a multi-dimensional space having a dimensionality that is lower than a number of data points to produce coordinates for an image point comprises projecting data elements of the object into a multi-dimensional space having a dimensionality that is lower than a number of data points to produce coordinates for an image point.

11. The method of claim 9,
wherein the electromagnetic radiation is projected onto a first side of the surface,
wherein the object is near a second side of the surface, and
wherein the first side is obverse to the second side.

12. The method of claim 9, wherein detecting an object near the surface comprises detecting an object touching the surface.

13. A system comprising:
one or more processing devices; and
at least one non-transitory computer-readable storage medium encoded with executable instructions that, when executed, cause the one or more processing devices to perform operations comprising:
detecting, using electromagnetic radiation projected proximally to a surface, an object near the surface;
determining whether the detected object is of a predetermined object type using a trained recognition model, the recognition model being trained to determine whether the detected object is of the predetermined object type based on an appearance of the detected object; and
generating a user input to a computer application based on the detected object, if it is determined that the detected object is of the predetermined object type.

14. The system of claim 13,
wherein the electromagnetic radiation is projected onto a first side of the surface,
wherein the object is near a second side of the surface, and
wherein the first side is obverse to the second side.

15. A system comprising:
one or more processing devices; and
at least one non-transitory computer-readable storage medium encoded with executable instructions that, when executed, cause the one or more processing devices to perform operations comprising:
detecting, using electromagnetic radiation projected proximally to a surface, an object near the surface;
processing data elements of the object into a multi-dimensional space having a dimensionality that is lower than a number of data points to produce coordinates for an image point; and
generating a user input to a computer application based on the coordinates of the detected object.

16. The system of claim 15, wherein processing data elements of the object into a multi-dimensional space having a dimensionality that is lower than a number of data points to produce coordinates for an image point comprises projecting data elements of the object into a multi-dimensional space having a dimensionality that is lower than a number of data points to produce coordinates for an image point.

17. The system of claim 15,
wherein the electromagnetic radiation is projected onto a first side of the surface,
wherein the object is near a second side of the surface, and
wherein the first side is obverse to the second side.

18. The system of claim 15, wherein detecting an object near the surface comprises detecting an object touching the surface.

19. An apparatus, comprising:
means for detecting, using electromagnetic radiation projected proximally to a surface, an object near the surface;
means for determining whether the detected object is of a predetermined object type using a trained recognition model, the recognition model being trained to determine whether the detected object is of the predetermined object type based on an appearance of the detected object; and means for generating a user input to a computer application based on the detected object, if it is determined that the detected object is of the predetermined object type.

20. The apparatus of claim 19, wherein:

the electromagnetic radiation is projected onto a first side of the surface, the object is near a second side of the surface, and the first side is obverse to the second side.

21. An apparatus, comprising:

means for detecting, using electromagnetic radiation projected proximally to a surface, an object near the surface;

means for processing data elements of the object into a multi-dimensional space having a dimensionality that is lower than a number of data points to produce coordinates for an image point; and means for generating a user input to a computer application based on the coordinates of the detected object.

22. The apparatus of claim 21, wherein the means for processing data elements of the object into a multi-dimensional space having a dimensionality that is lower than a number of data points to produce coordinates for an image point comprises means for projecting data elements of the object into a multi-dimensional space having a dimensionality that is lower than a number of data points to produce coordinates for an image point.

* * * * *